(12) United States Patent
Acharya et al.

(10) Patent No.: US 7,434,166 B2
(45) Date of Patent: Oct. 7, 2008

(54) WIRELESS PRESENTATION SYSTEM

(75) Inventors: Shrikant Acharya, Fremont, CA (US);
Shrinath Acharya, Fremont, CA (US);
John E. Crosbie, Fremont, CA (US);
Shiro Ninomiya, Fremont, CA (US)

(73) Assignee: Harman International Industries Incorporated, Northridge, CA (US)

( * ) Notice: Subject to any disclaimer, the term of this patent is extended or adjusted under 35 U.S.C. 154(b) by 567 days.

(21) Appl. No.: 10/859,653

(22) Filed: Jun. 2, 2004

(65) Prior Publication Data

US 2005/0036509 A1 Feb. 17, 2005

Related U.S. Application Data

(60) Provisional application No. 60/475,751, filed on Jun. 3, 2003.

(51) Int. Cl.
*G06F 13/00* (2006.01)
*G06F 15/00* (2006.01)

(52) U.S. Cl. ...................... 715/740; 715/854
(58) Field of Classification Search ......... 715/740–765, 715/853–854, 840–843; 709/223, 209
See application file for complete search history.

(56) References Cited

U.S. PATENT DOCUMENTS

| | | | | |
|---|---|---|---|---|
| 6,343,313 | B1 * | 1/2002 | Salesky et al. | 709/204 |
| 6,928,461 | B2 * | 8/2005 | Tuli | 709/203 |
| 7,242,406 | B2 * | 7/2007 | Robotham et al. | 345/581 |
| 2002/0080091 | A1 | 6/2002 | Acharya et al. | |

OTHER PUBLICATIONS

U.S. Appl. No. 10/066,402, filed Jan. 31, 2002, Crosbie et al.

* cited by examiner

*Primary Examiner*—Kevin Nguyen
(74) *Attorney, Agent, or Firm*—Brinks Hofer Gilson & Lione

(57) ABSTRACT

A system and method for interactive management of multiple wireless devices (such as PDA's or desktop or laptop computers) making graphical or video presentations while connected wirelessly to a display device whose wireless module converts the transmitted data from the wireless devices to the required format for display.

43 Claims, 23 Drawing Sheets

WIRELESS PRESENTER

PRESS [BACK] TO RETURN.

PROJECTOR NAME: MP3130
PROJECTOR PASSWORD: FREMONT

WIRED NETWORK
    IP ADDRESS:

WIRELESS NETWORK
    IP ADDRESS: 172.16.0.1
    WIRELESS.NETWORK TYPE: AD-HOC
    NETWORK ID (SSID): HPPROJECTOR
    ENCRYPTION: NO
    WEP KEY:
    KEY INDEX:

WIRELESS PRESENTATION SYSTEM

PRIORITY CLAIM

This application claims the benefit of U.S. Provisional Application No. 60/475,751, filed Jun. 3, 2003. The disclosure of the above application is incorporated herein by reference in its entirety.

BACKGROUND OF THE INVENTION

1. Technical Field

This invention relates to computers, and more specifically to wireless computer communications.

2. Related Art

Portable computers have used a variety of peripherals and software tools for the projection of presentations for viewing by an audience. One example is the use of a laptop computer connected to a liquid crystal display (LCD) projector to present a PowerPoint® document onto a projection screen in a darkened room. The LCD projector may be aligned in the room so that its projected image is viewable to the audience. The projection is created by a variety of technologies, such as the passing of light through an LCD panel that selectively transmits monochrome or color pixels to form the projected image.

Wireless devices capable of wireless data transmission include laptop computers and handheld computing devices such as PDAs (Personal Digital Assistants) and cellular telephones. Relative to laptop computers, the advantage of PDAs is their smaller size, lower cost, and ease of portability. The PDAs disadvantage is that their screens are of low resolution, primarily intended for viewing by a single user, and that they have relatively slow microprocessors. A wired presentation solution for PDAs is Presenter-to-Go® by MARGI Systems® that provides a wired interface from the various I/O ports available on PDAs to the VGA port of display devices (e.g., projectors). Compressed data is transmitted into the PDA (from a personal computer) and de-compressed by the Presenter-to-Go® module which contains a graphic engine that allows high resolution graphics output. Thus Power-Point® and anything printable from a PC (personal computer) application may be transmitted to be presented on the PDA for high resolution color presentation. The Presenter-to-Go® is a wired system and allows use by only one presenter at a time.

SUMMARY

Described herein are techniques and systems for connecting computing units such as laptops and PDAs with display units such as presentation projectors. These techniques and systems may be used in a display system that may be shared by a group of users, each of whom wishes to present video data on a shared digital projector, computer monitor, or other video display. The video data may include data for still images, or may include various types of information suitable for delivery to a video display, such as images, text, graphics, moving pictures, or presentations.

The video data may be information usable purely for visual display. Additionally, the video data may also be audiovisual information, such as purely audio information or a mixture of audio and visual information. We note that the techniques described herein for a display system may be also adapted for purely audio implementations. Thus, the data provided by a controller may be used on a video display or on other audio-visual presentation devices, such as speakers, personal computers, home audio systems, cellular telephones, and other systems. Thus, the video data provided by a controller may be audio, video, graphics, still images, moving images, or other data types, or combinations thereof. The video data may include compressed or uncompressed content information, or rendering instructions, or telemetry information, or combinations thereof. Rendering instructions include commands or other instructions for creating or displaying audio, graphics, video, or other audiovisual content. Telemetry information includes maintenance information, such as the status of a projector bulb in a display projector, or upgrading software that may be loaded onto a display system.

The various users may have a variety of different computing devices that connect with the video display, such as laptop computers, networked computers, or hand-held devices such as PDAs, cellular telephones, mobile telephones, audio receivers, wireless audio receivers, wireless speaker systems, or others. The computing devices may be networked or directly linked with the display system, and may be connected through wired links (such as Ethernet or USB connections) or wireless links (such as wireless Ethernet or Bluetooth® connections).

One implementation of a shareable display system includes a video display, a data port, and a controller. The video display may be a video projector or other form of display device, such as an LCD monitor or a CRT monitor, and may use wired or wireless data connections between the controller and the video display. The video display may include more than one display device, which may be useful in situations where audiences may need more than one display device.

Alternately, or in addition, the video display may be an interface that provides analog or digital video signals to one or more display devices. Accordingly, the display system may include a display device, or may be connectable to a display device, or may be configured so that it can be mechanically attached or piggybacked onto a display device.

The data port is configured to receive video data through data links with two or more computing devices. The data links may be hard-wired network connections or wireless connections. The controller may be coupled to the video display and to the data port, and may be configured to select video data for the video display from various video data sets available from the plurality of computing devices. The controller may arbitrate between video data received through the first and second data links.

This arbitration may be performed in a variety of modes. For example, in a self-serve mode, users send video data to the shareable display system, and the shareable display system updates the display with the most recently received video data received. In a roundtable mode, a user must relinquish control over the display system before another user may send video data to be displayed. In a moderated mode, a single user moderates the sharing of the display system by other users.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 7 shows an example of a settings summary 700 that may be displayed by a shared display device.

DETAILED DESCRIPTION OF THE PREFERRED EMBODIMENTS

Figure 1:
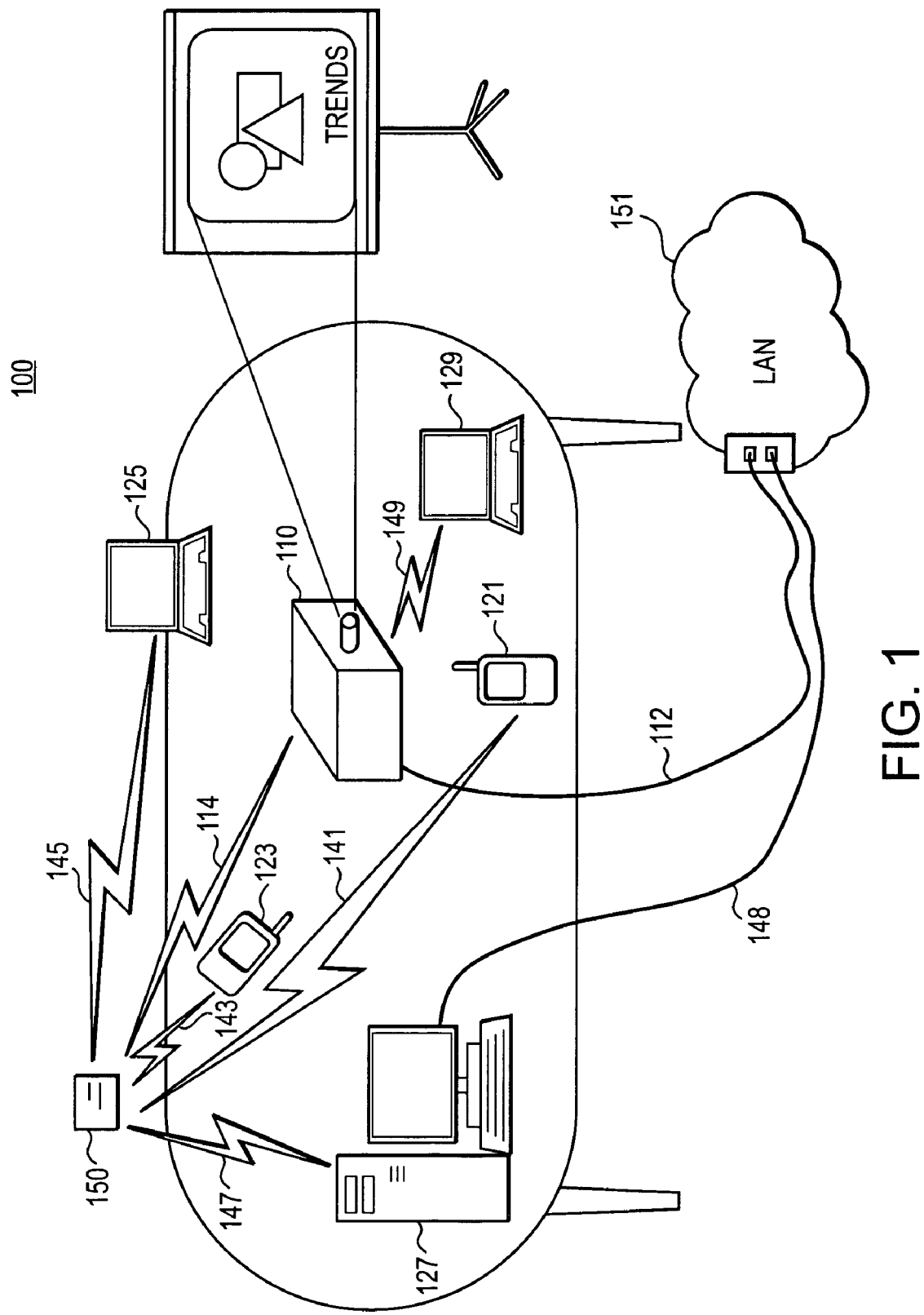
FIG. 1 and FIG. 2 illustrate environments in which a display system is shared by several users.

FIG. 1 illustrates an environment 100 in which a display system is shared by several users. A projector 110 may be shared by several users for projecting video onto a projection screen. The various users may control the projector 110 through a variety of computing devices, such as laptop computers 125 and 129, a desktop computer 127, or PDAs 121 and 123. Other computing devices may also be used, including portable and non-portable computing devices. Portable devices include devices such as PDA's, cellular telephones and other mobile telephones, and integrated devices such as palm-held computing devices with or without wireless telephone or network connectivity. The computing devices may connect to the projector 110 through a variety of links. In this illustration, the projector 110 is connected into a computer network through a wireless access point 150 through a wireless link 114. The wireless access point 150 also connects with four of the computing devices 121, 123, 125, and 127 through wireless links 141, 143, 145, and 147, respectively. These wireless connections allow digital communications between these computing devices and the projector. Alternatively or additionally, a wired network connection may be used to provide communications between computing devices and the projector 110. For example, desktop computer 127 has a wired connection 148 with a wired local area network (LAN) 151. A wired connection 112 connects the projector 110 to the wired LAN 151. The wired LAN 151 and the wireless access point 150 may use coordinating protocols to manage communications among the various devices connected thereto. Alternatively or in addition, connections with the projector 110 may be made on an ad-hoc basis. For example, computing device 129 communicates with the projector 110 through an ad-hoc network link 149.

The display system may maintain a cached list of users that have previously logged in to the system. This cache may be stored in a memory in the display system, or may be stored on a server computer accessible through a network. The user's computing devices may store a cached list identifying display systems onto which they have previously connected, thereby facilitating reconnections in the future.

To prevent unwanted users from gaining access to the video display, the display system may include authentication procedures for identifying users that connect to the display system. For example, at the start of a meeting, the video display may project a settings summary with connection information for viewing by an audience. The connection information may include a wireless encryption passphrase or other password information, thereby enabling only audience members to connect to the display system. Alternatively, or in addition, the display system may maintain a list of approved users, who may then log into the display system.

The controller may include firmware stored in a memory and a processor for running the firmware. To increase versatility of the display system, the firmware may be configured to allow the display system to interface with a variety of computing devices running a variety of operating systems, such as various versions of Windows®, Mac OS®, or Palm OS® operating systems, among others. The firmware may also be configured to accept uncompressed data or data compressed according to a variety of compression protocols to create images for display. Compression formats that may be implemented include, for example, JPEG, GIF, TIFF, MPEG, WAV, run-length encoding, MP3, and AC3, among others. Alternatively, or in addition, the video data may use display instructions or graphics commands to compactly communicate video information. Other techniques for compressing, encoding, and transferring video data may also be implemented, such as, for example, approaches described in U.S. patent application Ser. No. 09/746,841 for "INFORMATION TRANSMISSION AND DISPLAY METHOD AND SYSTEM FOR A HANDHELD COMPUTING DEVICE," and in U.S. patent application Ser. No. 10/066,402 for "TRANSFER OF IMAGES TO A MOBILE COMPUTING TOOL," the disclosures of which are hereby incorporated by reference herein in their entirety.

The display system may include a memory-card interface that enables the display system to read video data from a removable memory, such as CompactFlash® memory, a SmartMedia® memory, or a USB memory stick, among others, and display images based on the data from the removable memory. The display system may include a network interface that enables the display system to read video data from an archive, or a server, or an internet address, or a data file accessible through the network connection.

The display system may include interfaces and support for obtaining software updates over a computer network. A computer network may also be used to link the display system to other supporting tools, such as a database of users authorized to access the display system. Such a database may also be stored in a memory on the display system. Users may similarly store cached information that includes identifying characteristics of display systems onto which they have previously connected.

Instead of (or in addition to) projecting images on a separate display, the display system may be configured to employ the users' computing devices to display video. In this mode, the projected images are displayed on one or more users' computing devices, which may be useful in situations where users can not view a single projected display. The display system may serve as a hub to which several users may connect their computing devices. The display system may then allow one of the users to project video onto the screens of one or more of the other users' computing devices.

The display system may serve as a mirroring display for a user who sends video data to the display system. In this implementation, once a user gains access to the display system, the video display projects a copy of visual information that appears on the screen of the user's computing device. Alternatively, the display system may be configured so that the video display serves as an extended monitor for the user, working in tandem with the screen of the user's computing device. In this implementation, the video display may simulate an adjacent screen or an overlapping screen that works in conjunction with the screen of the user's computing device, and may allow contiguous cursor movement or scrolling between the screen of the user's computing device and the video display. Still further, the video display may be implemented as a separate display tool, that displays video independently from the operation of the screen of the user's computing device. These and other implementations may be combined so that a user may select among them in various operating modes.

Various data-transfer protocols may be used in display systems that implement a display-mirroring function. One protocol, for example, may involve "screen scraping," in which an entire screen image is captured on a user's laptop computer or other computing device. The captured screen image may then be compressed and transmitted to the display system, where it is received, decoded, and displayed. Depending on the performance characteristics of the capturing computing device and the display system, this process may limit the frame rate that can be achieved by the display system.

A data-transfer protocol may also include an enhanced approach with conditional replenishment of the screen contents on a user's laptop computer or other computing device, coupled with reducing the screen graphics into a set of GDI (Graphics Display Interface) commands that may be transmitted to the display system. The display system may then re-paint the screen onto the shared display device. While this enhancement may use more complicated procedures, it may also enhance the performance of the system by reducing a required channel capacity or increasing a refresh rate.

By only updating the changed areas on the screen, the data-transfer protocol may reduce the amount of update data that has to be sent across a wireless conduit between a user's computing device and the display system. A GDI engine may be installed on the user's computing device. The GDI interface may be configured to understand the commands of the user's computing device, thereby largely eliminating the need to transmit actual images over a wireless link to the display system. Instead, the GDI interface may perform GDI trapping. The GDI interface may harvest graphics commands or instructions being used on the user's computing device, and may send those commands or instructions to the display system. Exceptions may occur when a certain figure or area would require an excessive amount of trapped GDI commands to be transmitted. In such situations, the data-transfer protocol may transfer regular graphics information: the area may be converted into a bitmap or other graphics element and transmitted to the display device.

If a user's computing device has sufficient processing capability (for example, if the user's computing device is a sophisticated laptop computer), a GDI trap may be created on the user's computing device. The GDI trap may capture all the commands provided to the user's display hardware, and transmit these commands to the shared display system. If the GDI engines match on the user's computing device and on the shared display system, then the trapped commands may enable the shared display system to replicate the display on the user's computing device. In some situations, the shared display system may include tools for accomplishing partial or substantial translations of the received GDI commands.

The data transfer protocol may employ image sectioning so that transmissions from a user's computing device to a shared display system need only include information describing recently updated sections of the display on the user's computing device. This sectioning of the image into its multiple components may be implemented with object oriented tools or data-flow driven tools, and may be used to enhance the performance of the shared display system.

GDI trapping, sectioning, and other data-transfer techniques may also be used for display modes other than mirroring modes. For example, sectioning may be employed with or without additional compression techniques to reduce the communications traffic between a user's computing device and a shared display device used as an extended monitor. Other combinations of techniques described herein may also be readily implemented.

The display system may be implemented with a blanking mode. In this mode, a user may issue a command to remove an image from the video display. This mode may be useful, for example, for speakers who wish to remove any distracting images during question and answer sessions at the conclusion of a presentation, or for temporary periods during a presentation. The blanked video display may be configured to present a darkened screen, a solid-color screen, an image of the user's selection, or some other image.

Figure 2:
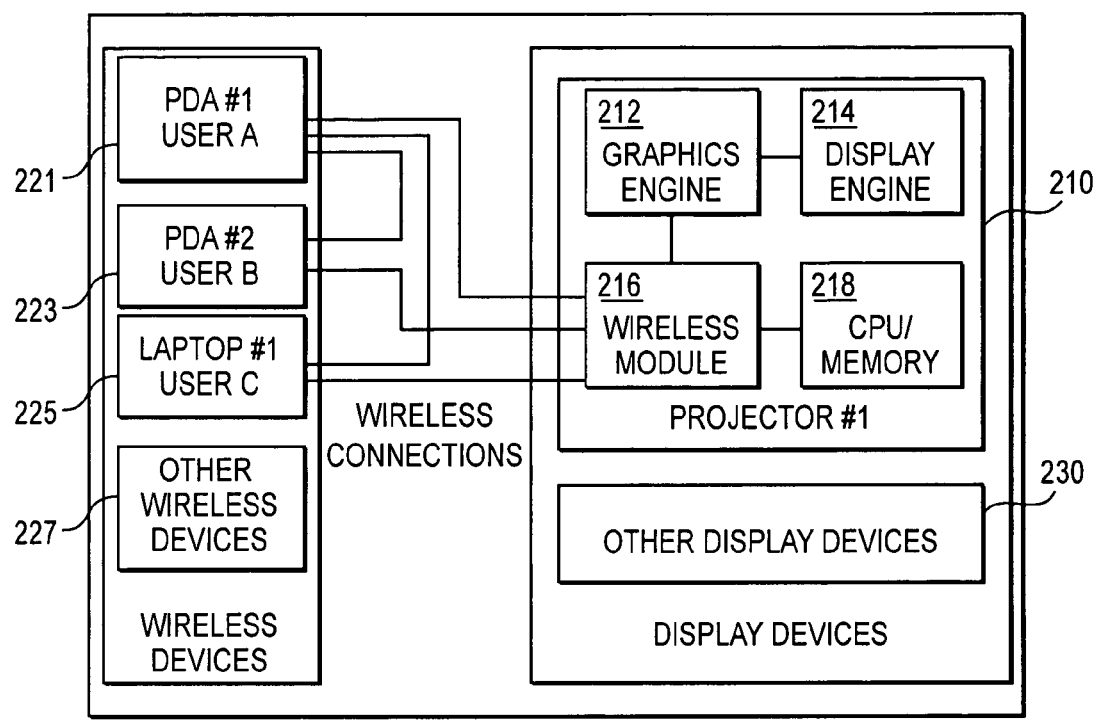

FIG. 2 is a block diagram illustrating an environment for an example of a multi-user display system. A first PDA 221 with the IEEE 802.11b wireless communications protocol is controlled by User A. Other suitable wireless protocols are IEEE 802.11a, 802.11g, 802.11n, 802.15.3a, Bluetooth®, and infra-red, among others. A second PDA 223 is another wireless device in the system, controlled by User B. A laptop computer 225 controlled by User C and other wireless devices 227 are also present in this example. The PDAs 221 and 223, the laptop computer 225, and the other wireless devices 227 may be used to control various display devices, such as a projector 210 and other display devices 230. The projector 210 may be, for example, a digital projection display device with 802.11b wireless communication protocol and a suitable firmware program loaded in its program memory. The projector 210 as shown here has a wireless module 216 to send and receive data or command signals by a wireless protocol, a CPU and memory 218 having a processor and associated memory for processing commands and reformatting data, a graphics engine 212 for setup timing, color information, image and scaling as required by the associated display, and a display engine 214 that provides interface circuitry to a display projector.

Negotiation procedures may be implemented on the portable computing devices 221, 223, 225, and 227 to allow negotiation among the devices 221, 223, 225, and 227 in gaining access to the display devices 210 and 230. Alternatively, these procedures may be implemented by the display devices 210 or 230. In one configuration, the computing devices 221, 223, 225, and 227 include software for facilitating sharing of display devices, and the display devices 210 and 230 include corresponding software for coordinating use by the computing devices 221, 223, 225, and 227.

Various levels of complexity may be offered in the procedures for coordinating the sharing of the projector 210, as described below. For example, a single-user mode may be offered as an option to users with a simple feature set that gives users a way of accessing the system with very little training. A second mode, enabling self-service by multiple users, may give more sophisticated users a powerful interface based on more complex interaction. Additional modes, such as roundtable and moderated multi-user modes, may provide for other advanced features.

Figure 3:
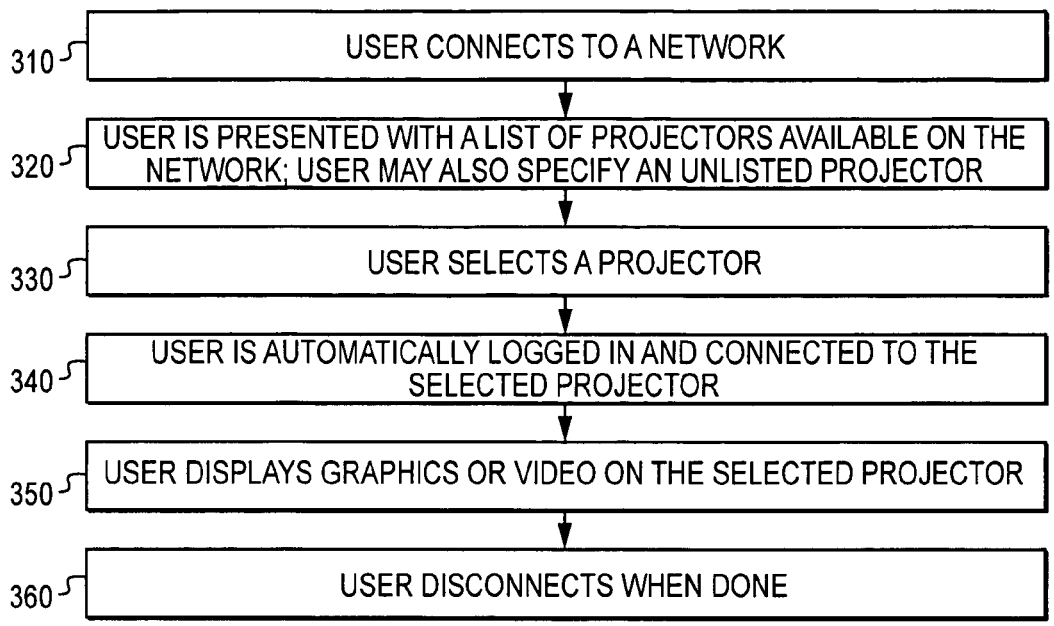
FIG. 3 is a flow chart illustrating a single-user mode for access to a display device.

FIG. 3 is a flow chart illustrating a single-user mode for access to a display device. This mode may be employed by a single user for using one or more display devices, such as a projector, without sharing the display devices with other users. A user initially connects with a network to which a projector is also connected in act 310. The network may be wired or wireless. The network may also include a combination of wired and wireless connections, as illustrated above with reference to FIG. 1. Creating the connection with the network may include network sign-in or authentication procedures. Upon connecting with a network through a wireless device, a user may be presented in act 320 with a list of projectors and other display devices available on the network. The user then selects one or more display devices and completes any sign-in or authentication procedures required by the projector in act 330. The user is then automatically granted access to the projector, and may be logged in as the controlling user connected to the projector in act 340. The user may then use the projector, displaying video information or audiovisual information on the projector in act 350. The user may then disconnect when desired in act 360.

Various implementations are possible for procedures for accessing a display device. For example, acts 320 and 330 described above may be replaced or supplemented with the ability of a user to specify a particular projector or other display device, including display devices that may not be included on a list of available display devices.

Figure 4:
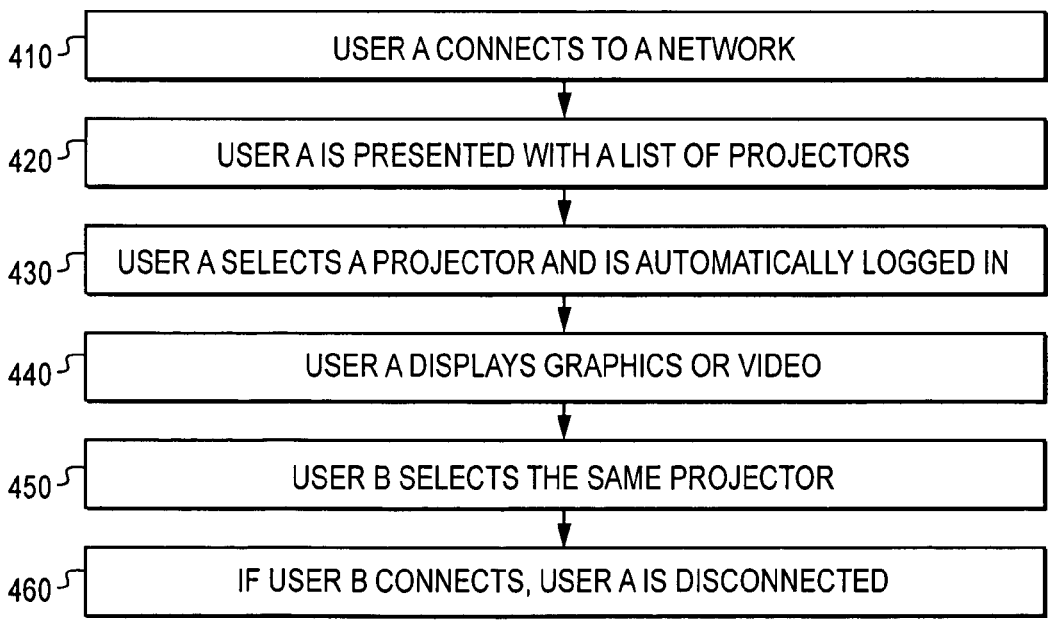
FIG. 4 is a flow chart illustrating a self-service multiple-user mode for access to a display device.

FIG. 4 is a flow chart illustrating a self-service multiple-user mode for access to a display device. This mode may be helpful, for example, in a conference room meeting with many users taking the podium in sequence, or in the situation of a single user switching between two wireless PDAs or other computing devices during a presentation. One feature that may be included is a safety mechanism: if a user does not log off after a presentation, the next user may nonetheless readily obtain control of the projector. In this implementation of the self-service multiple-user mode, an initial user, designated User A, connects with a network in act 410 through a computing device such as a laptop computer. In act 420, User A's computing device presents User A with a list of projectors available on the network. User A then selects a projector, completes any sign-in or authentication procedures required by the projector in act 430, and is automatically granted control as the initial user. User A may then use the projector in act 440.

While User A has control over the projector, a new user, designated User B, may select the same projector, as noted in act 450. User B's computing device may communicate with the projector through the same network as User A. Depending on the connectivity of the projector, however, Users A and B may each reach the projector through different networks, or one of the users may communicate with the projector through a networked link while the other user communicates with the projector through a direct or ad-hoc link. Upon initially selecting the in-use projector, User B may be alerted to the fact that the projector is already in use by User A. User B may then decide not to obtain control of the projector. However, as noted in act 460, if User B nonetheless connects to the projector, User A is then logged off from the projector and User B gains control over the projector.

Figure 5:
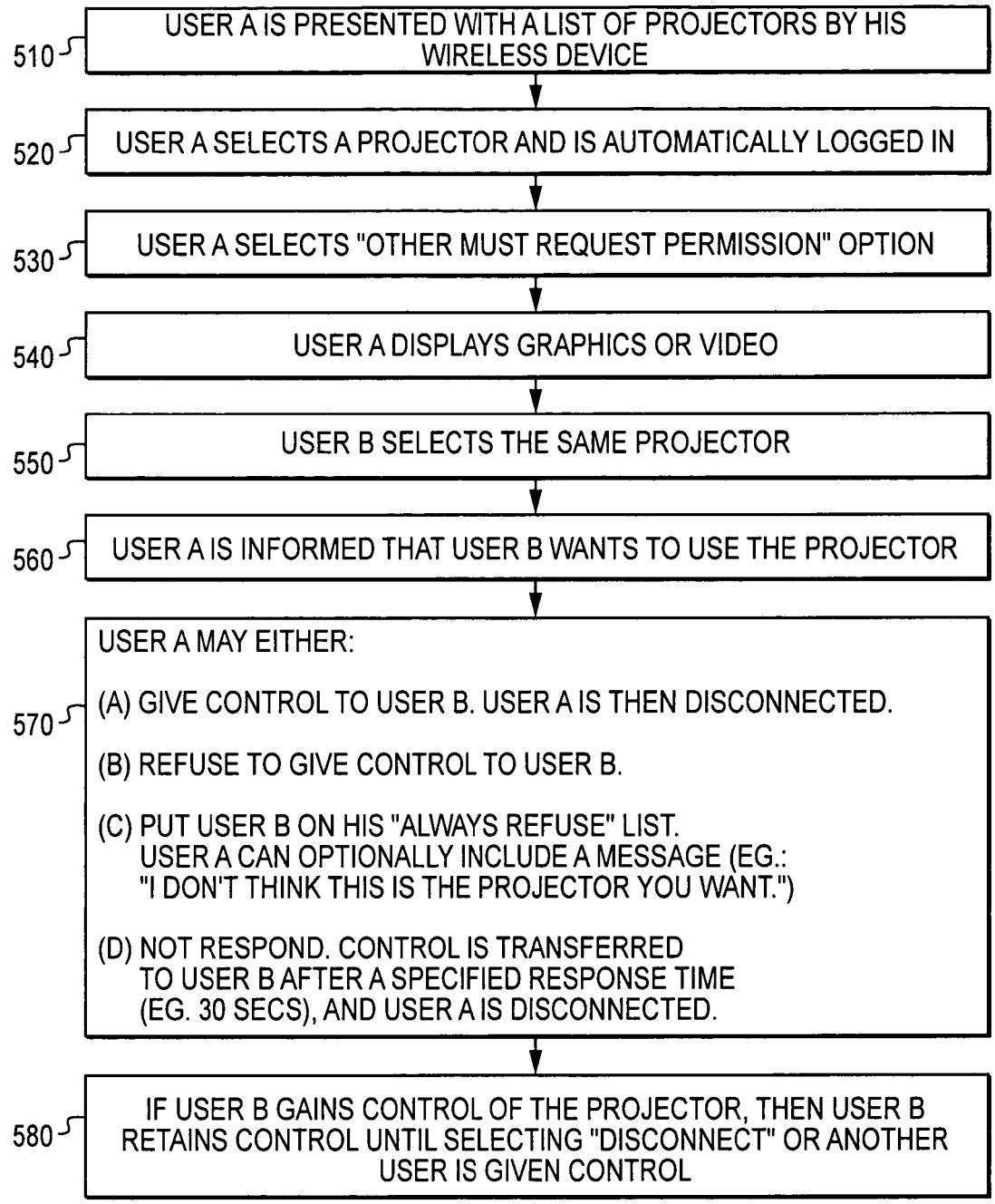
FIG. 5 is a flow chart illustrating a roundtable multiple-user mode for access to a display device.

FIG. 5 is a flow chart illustrating a roundtable multiple-user mode for access to a display device. This mode may be useful in a boardroom-type meeting, where participants are engaged in a meeting with formal rules of order.

In this implementation of the roundtable multiple-user mode, an initial user—User A—connects with network and is presented in act 510 with a list of projectors available on the network. User A then selects a projector, completes any sign-in or authentication procedures required by the projector in act 520, and is automatically granted control as the initial user. In act 530, User A may then select a "others must request permission" setting that dictates that any subsequent users seeking access to the projector must request permission from User A. Depending on the particular system implementation, this setting may be selected in a variety of ways. For example, User A may select an appropriate radio button on a dialog interface panel that is presented on User A's computing device after User A gains control of the projector. Alternatively, or in addition, User A may select the request-permission setting by operating a switch or other manual control on the projector housing. Alternatively, the projector may be configured so that the request-permission setting is a default setting, or is the only option for operating the projector. User A may then use the projector in act 540.

While User A has control over the projector, a new user, designated User B, may select the same projector, as noted in act 550. User A is then alerted to User B's desire to use the projector in act 560. This alert may be delivered, for example, in the form of a pop-up window on User A's computing device. User A may then choose a variety of responses to the alert in act 570, which may be selected, for example, through radio buttons on the pop-up window. User A may relinquish control of the projector, in which case User A is then disconnected from the projector. Alternatively, User A may refuse to relinquish control of the projector, in which case User B may be informed that the projector has not been made available. Additional tools may also be available to User A. For example, User A may be provided with an option to always refuse any future requests from User B, or from a specified list of users, or from all other users. User A may also have the option of responding with a customized message, such as a text message, to User B. Such a message may be helpful in situations where User A suspects that there may be some confusion in User B's selection of the projector, so that User B may have unwittingly requested access to the projector instead of requesting access to a different projector.

As noted in act 570, User A may choose not to respond. In the implementation depicted in FIG. 5, this choice may be interpreted to mean that User A has stepped away from his computing device or otherwise is no longer using the projector. The access mode then specifies that control of the projector is transferred from the nonresponsive User A to the requesting User B after an appropriate waiting period, such as a half a minute or some number of minutes.

If User B gains control following User A's response (or lack of response) in act 570, User B may then use the projector in act 580. Depending on the particular implementation of the access mode, User B may then have the option to select (or de-select) the "others must request permission" setting. User B retains control of the projector until another user obtains control or is granted control, or until User B disconnects from the projector.

Figure 6:
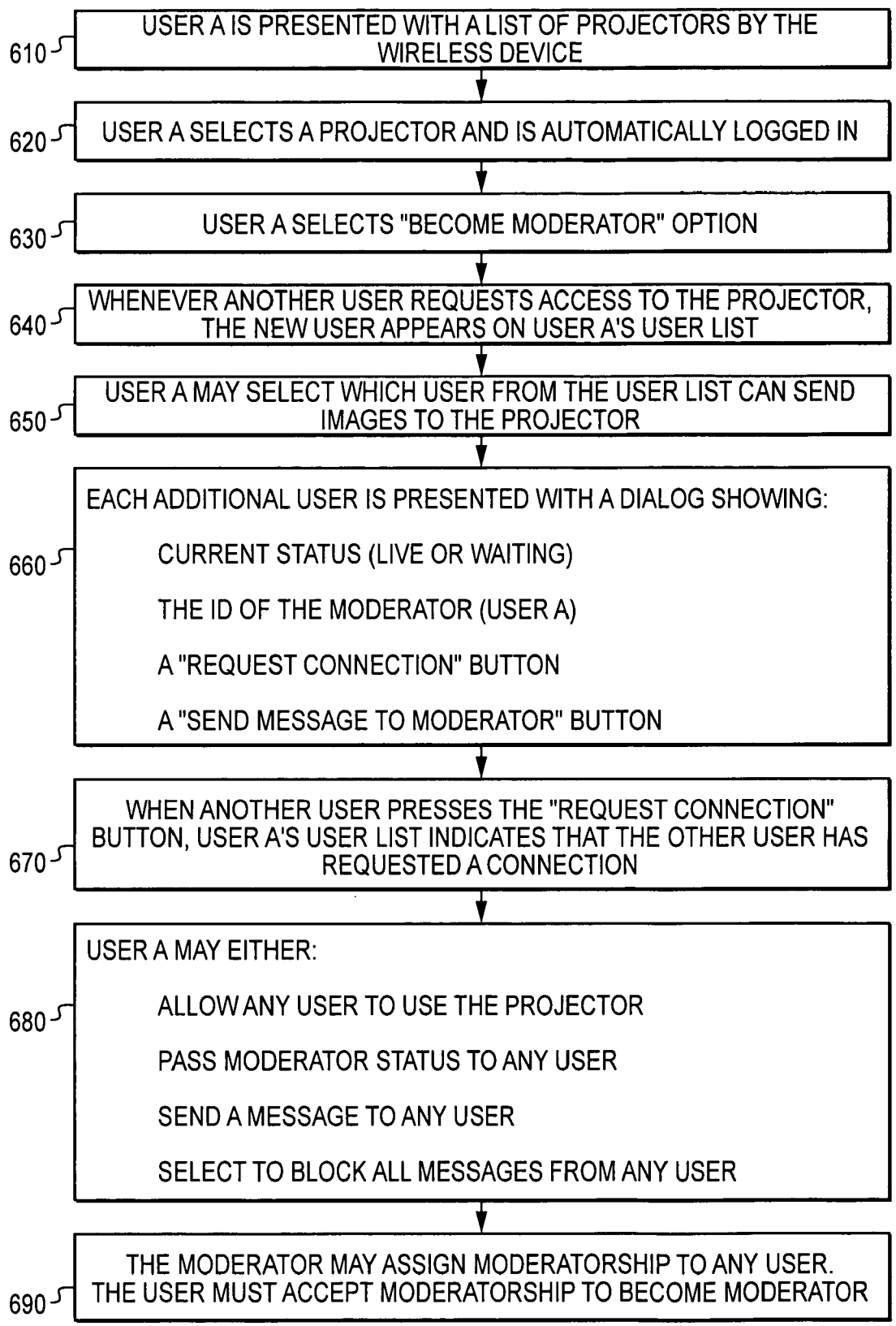
FIG. 6 is a flow chart illustrating a moderated multiple-user mode for access to a display device.

FIG. 6 is a flow chart illustrating a moderated multiple-user mode for access to a display device. This access mode may be useful in a moderated situation where one user is designated as the master controller and controls of the switching between users. In this implementation of the moderated multiple-user mode, an initial user—User A—connects with network and is presented in act 610 with a list of projectors available on the network. User A then selects a projector, completes any sign-in or authentication procedures required by the projector in act 620, and is automatically granted control as the initial user. In act 630, User A may then select a "become moderator" setting that gives User A an ability to dictate which of various users have control over the projector. Depending on the particular system implementation, this setting may be selected in a variety of ways. For example, User A may select an appropriate radio button or a check-box on a dialog interface panel that is presented on User A's computing device after User A gains control of the projector. Alternatively, or in addition, User A may select the become-moderator setting by operating a switch or other manual control on the projector housing. Alternatively, the projector may be configured so that the moderator setting is a default setting, or is the only option for operating the projector. User A may then use the projector, and may be provided with a list of users that are eligible to use the projector. This list may be based on a hierarchy of permissions, or may simply be a list of users that are linked to the network or linked directly to the projector. As the moderator, User A may be notified in act 640 whenever another user indicates a desire to use the projector. In act 650, User A may select among the eligible users to determine which user has control of the projector.

As indicated in act 660, eligible users may be provided with access information for the projector, including whether the user is "live" (currently having control of the projector), or is waiting to be granted control over the projector. The access information may also indicate who the current moderator is. The access information may be presented in a variety of forms, such as a pop-up window, or a toolbar, or a control panel, or a pull-down menu, or through other interfaces. The interface may also include a button or icon other input selection device for allowing a user to request control over the projector. The interface may also enable users to send and receive messages with each other or with the moderator (User A).

When a user requests control over the projector, the moderator is notified of the request in act 670. The moderator may then select among a variety of responses in act 680. The moderator may select any of the eligible users to control the projector. The selected user may then deliver data to the projector, such as images, video, audio, or audiovisual material as appropriate for the projector. The moderator may also have additional options, such as discontinuing the moderated multiple-user mode, or passing moderator status to another user, as noted in act 690, or sending messages to any user, or sending messages to all users, among others.

Procedures may also be included in the moderated multiple-user mode to facilitate smooth operation of the projector in the event that a moderator steps away from the moderator's computing device without first relinquishing moderator status. For example, the moderated multiple-use mode may be configured so that users are also provided with an input selection device for requesting that the moderator be disconnected. When a user selects this input, the moderator is notified. If the moderator does not respond within a set time period, the moderator loses the moderator status. Depending on the implementation of this feature, the moderator may be disconnected from the projector, or the projector may be switched to a non-moderated mode of operation.

Projection interface systems may be implemented with any one or more of the above access modes. Other operating modes for sharing access to a display device may also be implemented, combining various features noted above for the single-user, self-service multiple-user, roundtable multiple-user, and moderated multiple-user access modes. In interface systems offering two or more different access modes, users may be allowed to switch between access modes. For example, an interface system may have a manual control switch that allows users to select an access mode. Alternatively, users may select access modes through pop-up window interfaces or other graphical or textual on-screen interfaces. Such interfaces may query users to select an access mode upon connection to a display device, as illustrated in the foregoing examples by acts 530 and 630.

A variety of approaches are contemplated for enabling users to establish communications with projectors and other display devices, and for negotiating control over shared display devices. Described below are examples of user interfaces, as displayed to the user on their respective computing devices, for accessing and sharing display devices such as projectors 110 and 210. The various user interfaces may be displayed by software running on the user's laptop computer, PDA, or other computing device to coordinate sharing among the various users. The software may also enable the user to display video material on the shared display device.

An initial consideration is the ability of users to identify the display devices to which they may wish to connect. A user entering a conference room such as depicted in FIG. 1 may wish to join other users in sharing the use of a display device such as projector 110. Identifying the projector has not been an issue in previous systems, where a user might directly connect a laptop computer to a projector though a communications cable. However, in situations where a user may wish to make a connection to a display device either through a network, or wirelessly, or to one of several available display devices, the user would be aided by information that identifies the desired display device. This information may then be used by the user to ensure that a link is formed with that display device.

FIG. 7 shows an example of a settings summary 700 that may be displayed by a shared display device to show connection information for the display device. At the start of a meeting, a display device such as projector 110 in FIG. 1 may display such a settings summary for the benefit of users who may wish to establish a link between their respective computing devices and the display device. A settings summary may reveal a network node identity for the display device, and any passwords that may be required for establishing links with the display device. This approach may help prevent undesired links from people not in attendance at the location of the display system.

As depicted, the settings summary 700 indicates a name of the display device and a password for linking to the display device. In addition, the settings summary 700 also includes network identification information for a wireless network to which the display device is connected, such as an IP address of the display device on the network, the type of network connectivity (such as an ad-hoc/peer-to-peer organization or an infrastructure-based organization), a service set identifier (SSID) that identifies the wireless network to which the display device is connected, and whether or not any encryption is used in the wireless network. If encryption is being used, the settings summary 700 may display the wireless encryption protocol (WEP) key and index, or the Wi-Fi Protected Access (WPA) key information, or other passphrase information needed for communicating on the wireless network. Similarly, if the display device is connected to a wired network, an IP address of the display device on the wired network, or other appropriate information, may be displayed on the settings summary 700.

In the depicted example, the settings summary 700 is being displayed by a digital projector named "MP3130." In this example, the projector requires a password of "fremont." This projector is connected to an wireless network whose network ID (SSID) is "HPPROJECTOR," and the IP address of the projector on the wireless network is 172.16.0.1. The wireless network in this example uses no encryption. Further, this wireless network is an ad-hoc wireless network, such as illustrated by the wireless link 149 from FIG. 1.

In the depicted example, unauthorized access to the projector is provided by the use of the projector password ("fremont"). In other situations, administrators may choose not to have a password for the projector, but may protect the projector by requiring encryption on the wireless network to which the projector is connected. Administrators may also choose to use both network encryption and a projector password to thwart unauthorized access to the projector.

Figure 8:
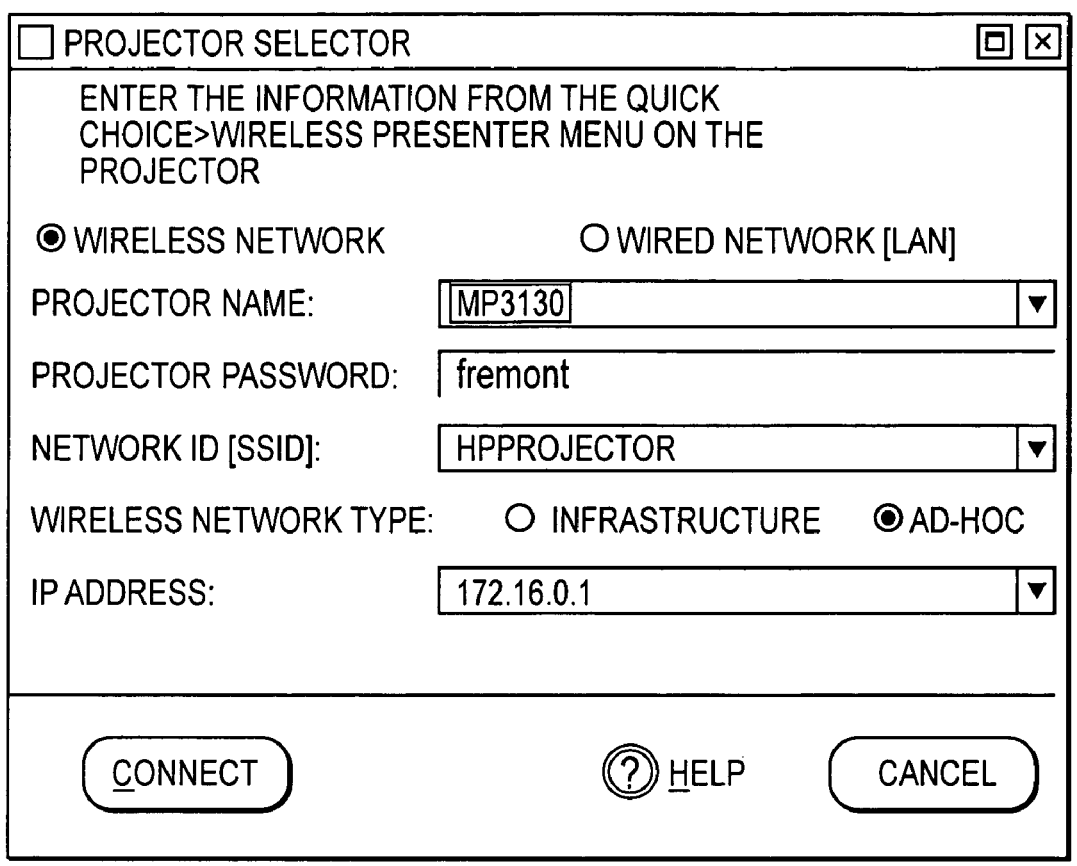
FIG. 8 shows an example of a selection and login interface 800 for connecting to a wireless network.

FIG. 8 shows an example of a selection and login interface 800 for connecting to a wireless network. Users attempting to establish a connection with a wireless network may use this interface to login to a wireless network on which a display device resides. For example, a user of the laptop computer 125 from FIG. 1 may invoke the selection and login interface 800 on the laptop computer 125 to establish a wireless ad-hoc network link with projector 110. In the depicted example, FIG. 8 shows such a connection being made with an ad-hoc wireless network using the information that was depicted in the settings summary 700. These settings indicate that a user is logging in to the ad-hoc "HPPROJECTOR" wireless network. The user is selecting the "MP3130" projector with IP address 172.16.0.1 on that network, and is providing the projector password "fremont."

Other interfaces may also be used for logging into a network or selecting a projector. For example, a Windows XP® standard interface may be used for logging into a wireless network.

Figure 9:
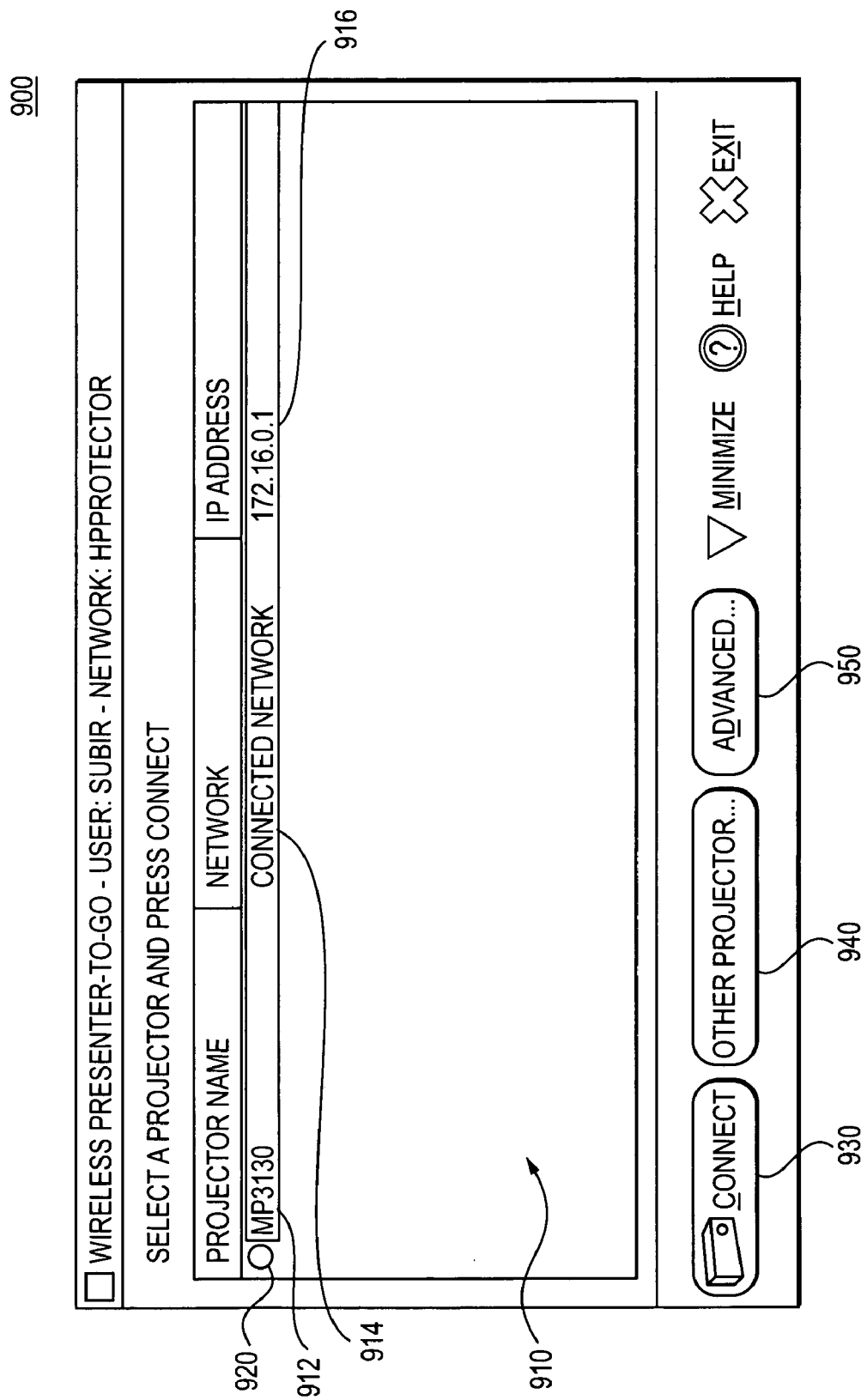
FIG. 9 shows an example of a display-selection interface 900 for a user connecting to a shared presentation system on a wireless network.

FIG. 9 shows an example of a display-selection interface 900 for a user connecting to a shared presentation system on a wireless network. Once a user has established a link with a wireless network, the display-selection interface 900 may be used to select a display devices from a list of display devices available on that wireless network. The depicted display-selection interface 900 includes a listing 910 of display devices, along with corresponding status markers 920, as well as a connect/disconnect button 930, an "Other Projector" button 940, and an "Advanced" button 950.

The listing 910 may include all display devices that are connected to the same network as the user's computing device. These connected display devices may be readily available for use. The listing 910 may include columns for display device names 912, network names 914, and IP addresses 916 of the display devices. The listing 910 may also include unavailable display devices, whose identifying information may be cached in memory on the user's computing device. The stored information on the unavailable display devices may be remembered from past sessions in which the user previously had access to the now-unavailable display devices.

The status markers 920 for each display device may indicate the display devices' readiness or availability. In one implementation of the display-selection interface 900, the status markers 920 are green, yellow, or red circles placed next to the names of each display device in the listing 910. Green circles may indicate that the corresponding display device is connected to the same network as the user's computing device, and may thus be immediately available for use. Red circles may indicate that corresponding display device is remembered in the cached information as a projector that used to be connected to the current network, but is not currently connected to the network, and thus appears to be no longer available. Yellow circles may indicate that the corresponding display device is remembered in the cached information as a projector connected to a different network, and which thus may be available if the user were to disconnect from the current network and login to the different network.

The "Other Projector" button 940 may be used to invoke an interface for selecting an unlisted projector. The "Advanced" button 950 may be used to invoke other interface tools, such as for configuring settings of a projector or of network connection.

A variety of security tools may be employed to protect access to shared projectors. In addition to the network encryption and the passwords for display devices discussed above, a system for sharing display devices may also employ user identification to limit access to approved users.

Figure 10:
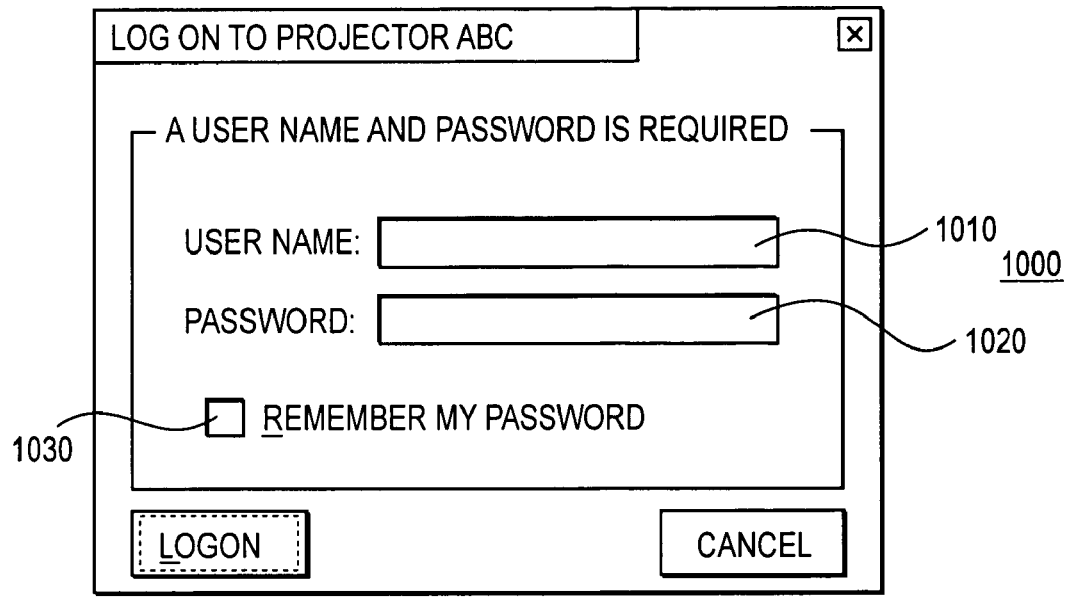
FIG. 10 illustrates an example of a user-login interface.
Figure 11:
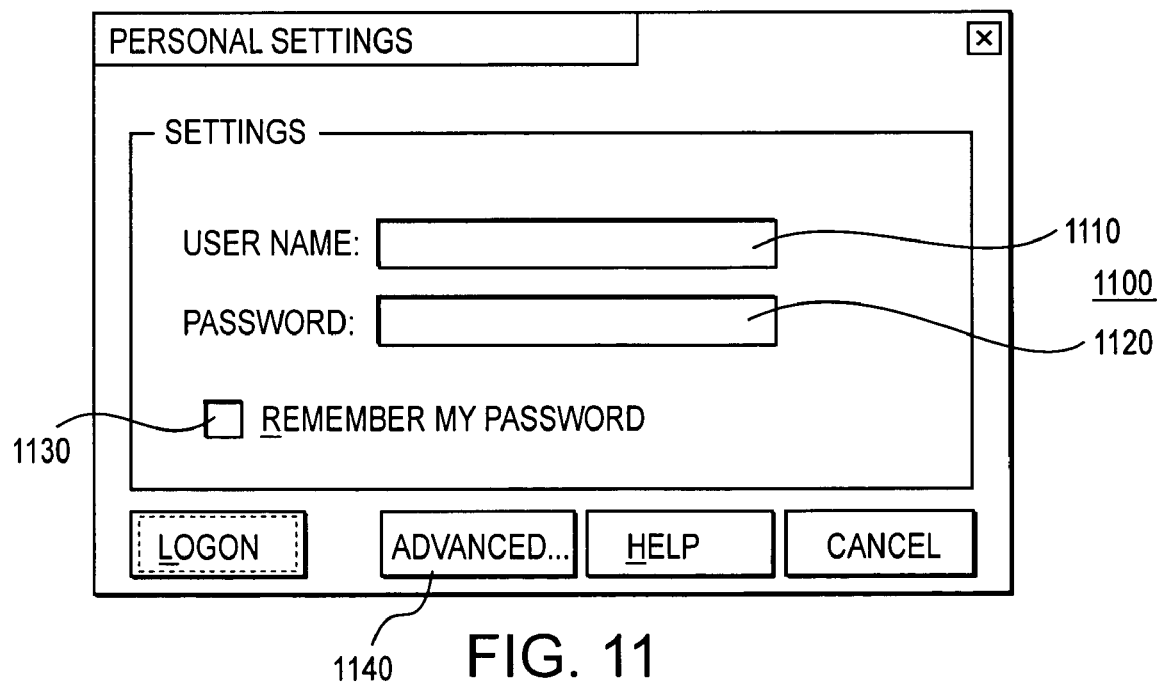
FIG. 11 shows a dialog box for updating user login information on a display device.

FIG. 10 illustrates an example of a user-login interface 1000. Depending on a particular implementation, the user-login interface 1000 may be presented on a user's computing device when the user requests a connection with a particular display device limited to a select group of users. The user-login interface 1000 may request a user name 1010 and a user password 1020. The user-login interface 1000 may also include an option 1030 allowing the user to locally store the user password on the user's computing device. The user name and user password may be initially set by an administrator with special access to the display device. In various implementations, the user names and user passwords may be managed and updated by users. FIG. 11 shows an example of a personal settings interface 1100 in which a user may update the user name 1110 or the user password 1120 or both, after first logging in through the user-login interface 1000. The personal settings interface 1100 may also include an option 1130 allowing the user to locally store the user password, and an advanced options button 1140 for use by administrators of display devices.

Figure 12:
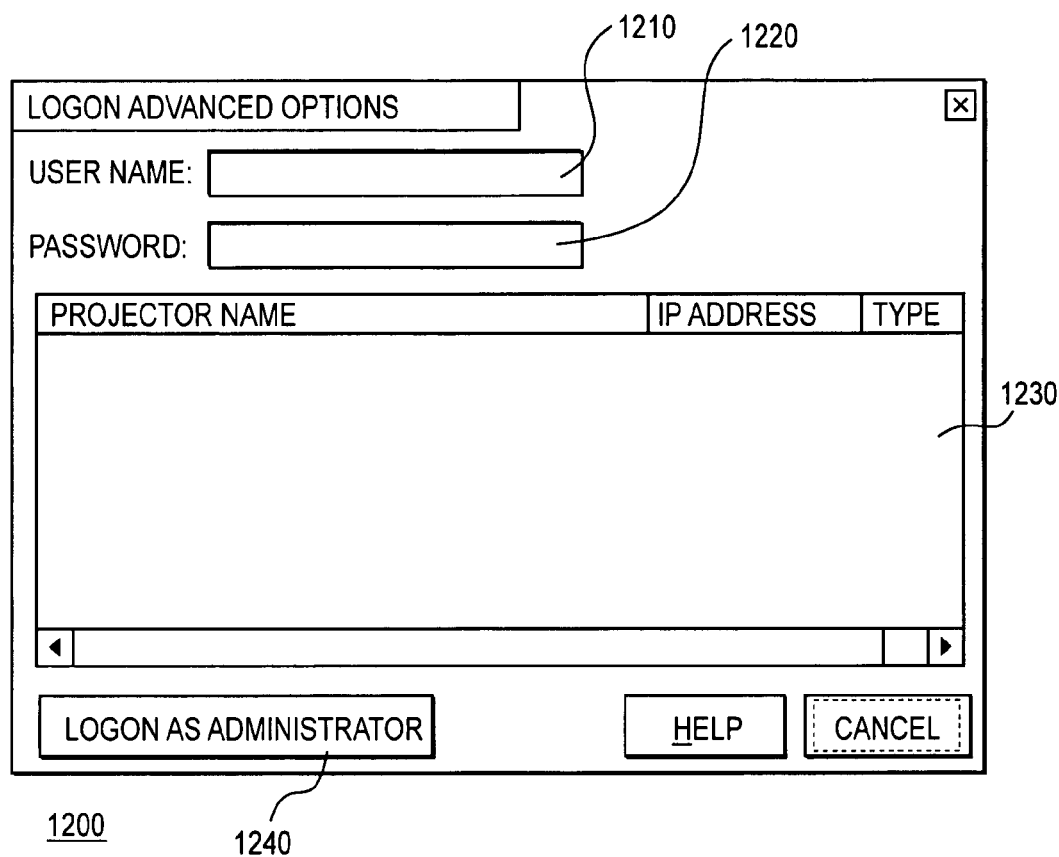
FIG. 12 shows a dialog box for an administrator to login to a shared display device.

FIG. 12 shows an example of an administrator logon interface 1200 that allows entry of a administrator name 1210 and the administrator password 1220 while also displaying information on available display devices 1230 that an administrator may select for access. The advanced logon interface 1200 may be invoked when a user selects the advanced options button 1140 from FIG. 11. The advanced logon interface 1200 may also include an administrator logon button that initiates access to advanced administrator features of a display device, such as maintenance features, the maintenance of user lists, and software upgrade opportunities.

Figure 13:
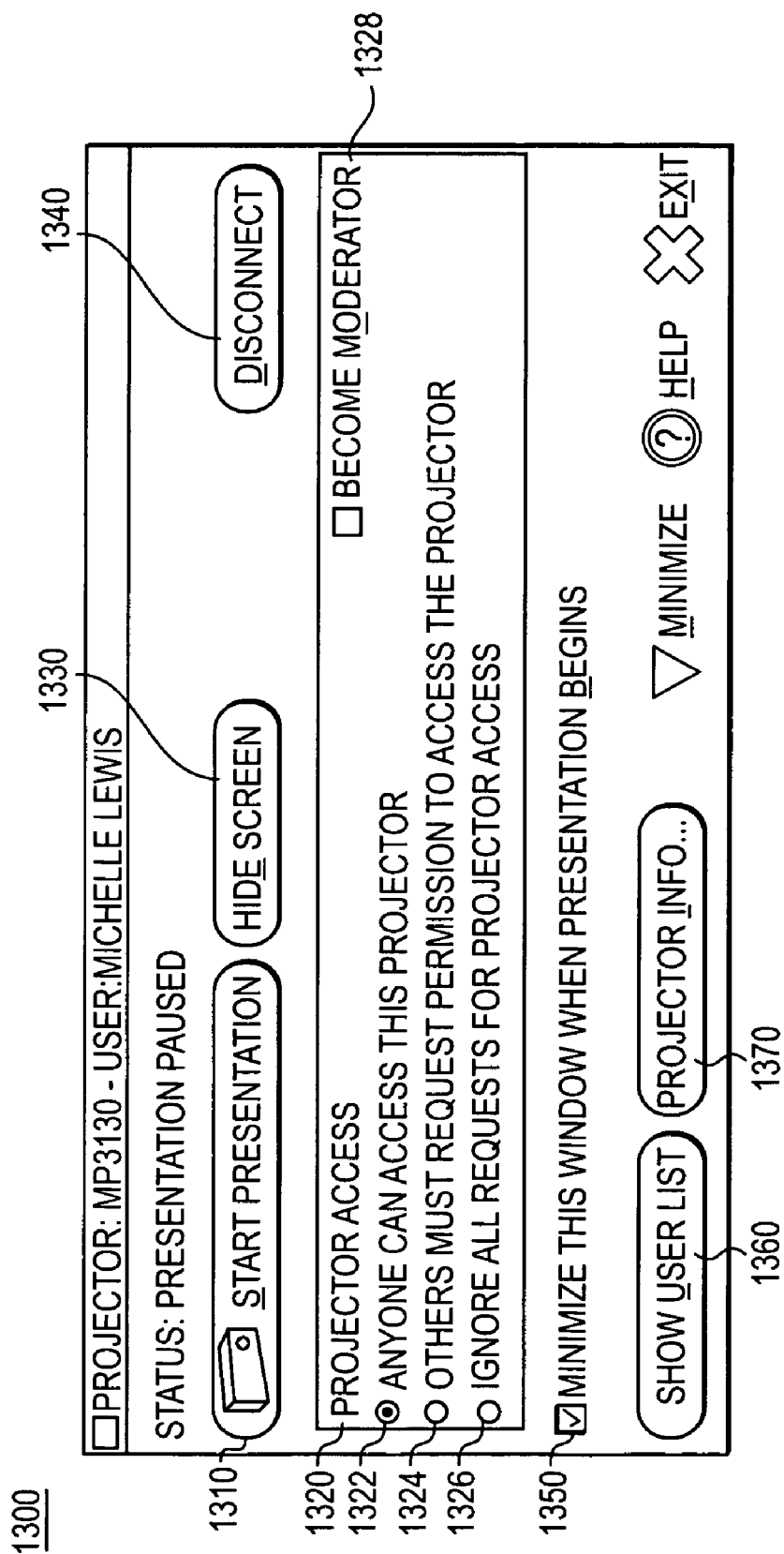
FIG. 13 and FIG. 14 show examples of a display-sharing interface for a user connected to a shared presentation system.
Figure 14:
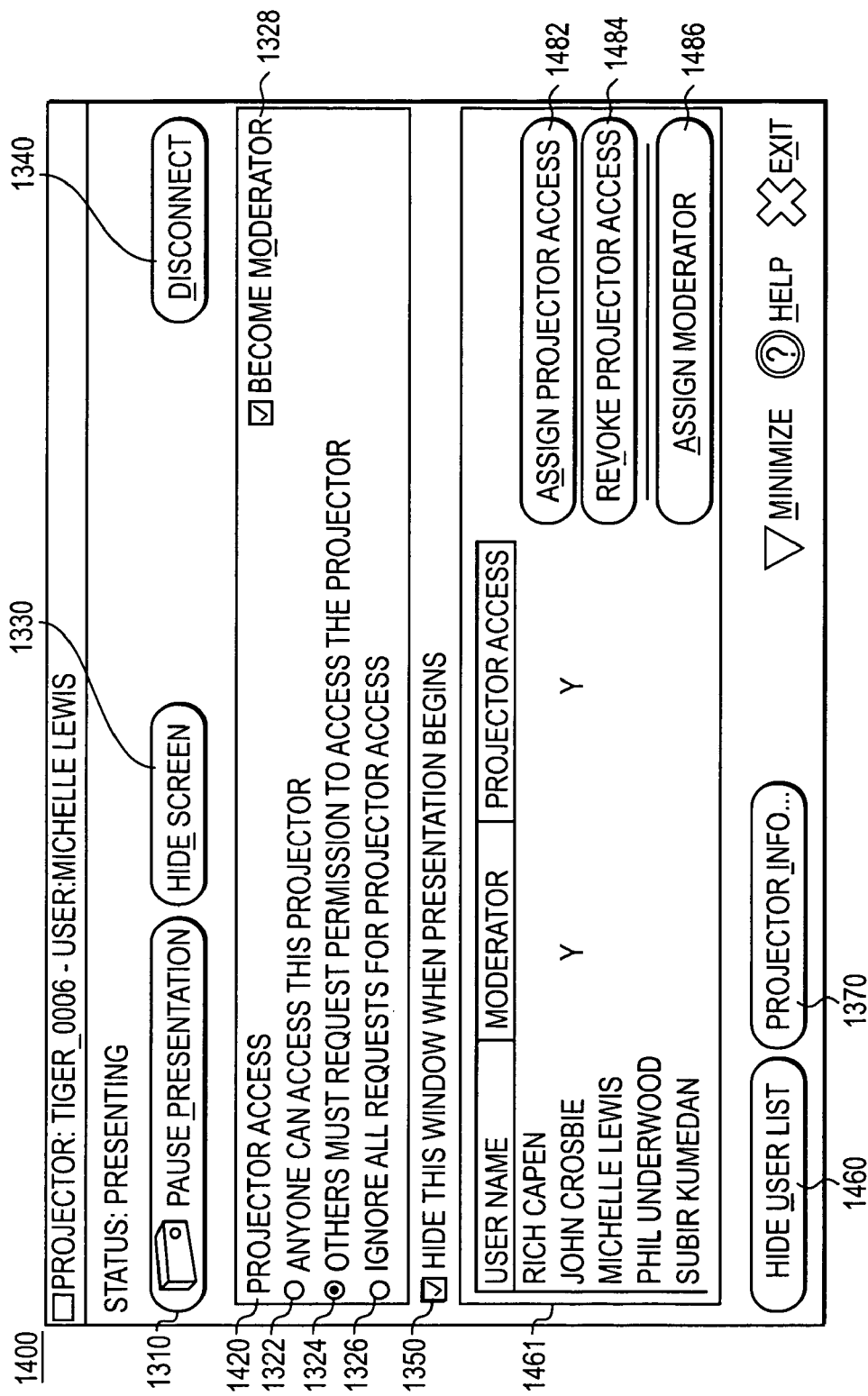

Once a user has established communication with a selected display device, the user's computing device may display an interface that the user may use to coordinate sharing of the display device with other users. FIG. 13 and FIG. 14 show examples of a display-sharing interface for a user connected to a shared presentation system.

FIG. 13 shows an example of a display-sharing interface 1300 that may be displayed on a user's computing device once the user establishes communication with a shared display device, such as the projector 110 in FIG. 1, and gains control over the display device. The display-sharing interface 1300 depicted here includes a Start Presentation button 1310, a Sharing Mode section 1320 (which may also be called a Projector Access section), a window minimizing checkbox 1350, a Show User List button 1360, a Projector Info button 1370, a Hide Screen button 1330, and a Disconnect button 1340.

When the user selects the Start Presentation button 1310, the user's computing system initiates a presentation or other pre-selected video display or other pre-selected audiovisual display for presentation on the display device. The window minimizing checkbox 1350 may be selected if the user wishes the display-sharing interface 1300 to be removed from the main view of the user's computing device after the user's presentation is initiated. If the user wishes the presentation to be blanked or hidden, the user may select the Hide Screen button 1330. This button 1330 enables a user to temporarily blank the display being viewed by an audience when the user wishes to discusses a point without the distractions of a visible display. This button 1330 also allows a user to blank the display device at the conclusion of the user's presentation. As an alternative to blanking the display, the Hide Screen button 1330 may cause the display device to present a pre-determined graphic selected by the user. The Projector Info button 1370 calls an informational interface with information for monitoring the display device, and may also be used for maintaining the display device and administering lists of approved users on the display device. The Disconnect button 1340 may be selected by a user to terminate the user's control over the display device at the conclusion of the user's presentation.

The Sharing Mode section 1320 depicted in FIG. 13 includes options for selecting a mode for sharing access to the display device. As depicted in this example, this section includes radio buttons to select one of three access modes. A first access mode 1322 is designated to allow any user to gain control of the projector. This first access mode 1322 may implement the access-sharing protocol described above for the self-service multiple-user access mode (illustrated by example in FIG. 4). A second access mode 1324 is designated to force any other users to obtain the permission of the current user (the user currently with control and use of the display device) before the other users may use the display device. This second access mode 1324 may implement the access-sharing protocol described above for the roundtable multiple-user access mode (illustrated by example in FIG. 5). A third access mode 1326 ignores all requests for control of the display device. This third access mode may implement the access-sharing protocol described above for the single-user access mode (illustrated by example in FIG. 3).

The Sharing Mode section 1320 depicted in FIG. 13 also includes a moderator option 1328 checkbox for initiating a moderated access protocol. Enabling the moderator option 1328 may implement the access-sharing protocol described above for the moderated multiple-user access mode (illustrated by the example in FIG. 6). Depending on the implementation, the moderator option may be modified by the selection of the radio buttons 1322, 1324, and 1326. For example, the moderated multiple-user access mode may be augmented by allowing the moderator-user to select whether anyone may be granted access by the moderator, or whether only requesters may be granted access by the moderator or whether the moderator may ignore all requests for access while maintaining the privilege of granting access. Alternatively, the moderator option 1328 may override the selections made in radio buttons 1322, 1324, and 1326. As depicted in FIG. 13, the display-sharing interface 1300 illustrates the selection of the single-user access mode (radio button 1322), without the use of the moderator option 1328.

The Show User List button 1360 expands the view presented by the display-sharing interface 1300 to include a list of users currently in communication with the projector. An example of this expanded display-sharing interface is depicted in FIG. 14.

FIG. 14 shows an expanded display-sharing interface 1400 that is similar to the display-sharing interface 1300 from the previous figure, with many common elements. The expanded display-sharing interface 1400 additionally includes a user list 1461 showing users currently connected to the display device. FIG. 14 also illustrates the selection of a "request permission" multiple-user access mode (radio button 1324), combined with the use of the moderator option 1328. Accordingly, the user list 1461 indicates which of the listed users has moderator status, along with indicating which user currently has use of the display device. The expanded display-sharing interface 1400 also includes buttons for revoking access from the current user 1484, assigning access to a selected user 1482, and assigning moderator status to a selected user 1486.

Figure 15:
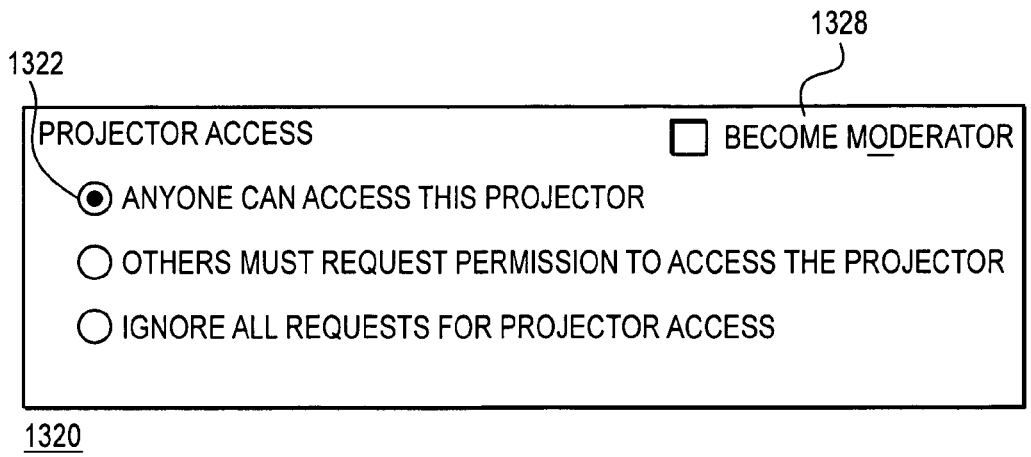
FIG. 15, FIG. 16, FIG. 17, and FIG. 18 illustrate examples of user dialog windows that may be implemented in a self-service multiple-user access mode.
Figure 16:
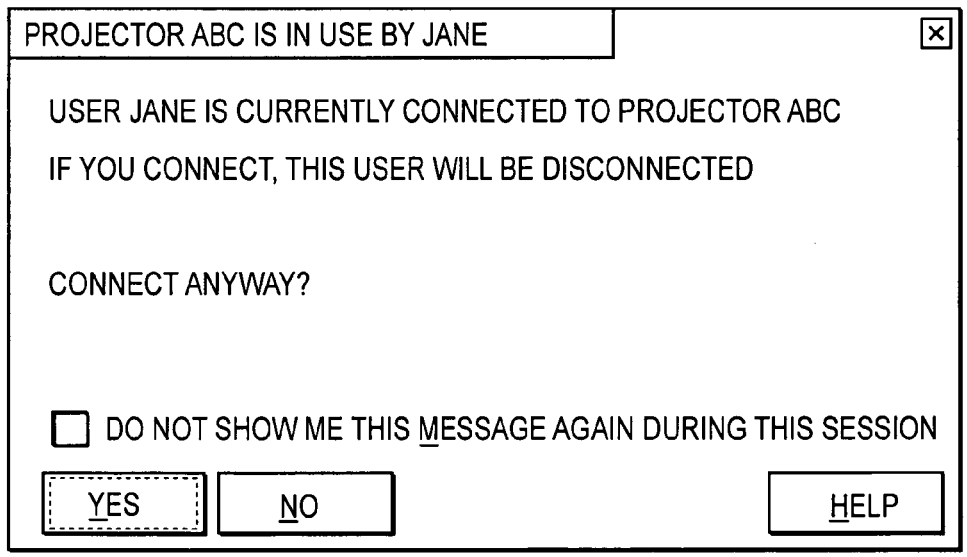
Figure 17:
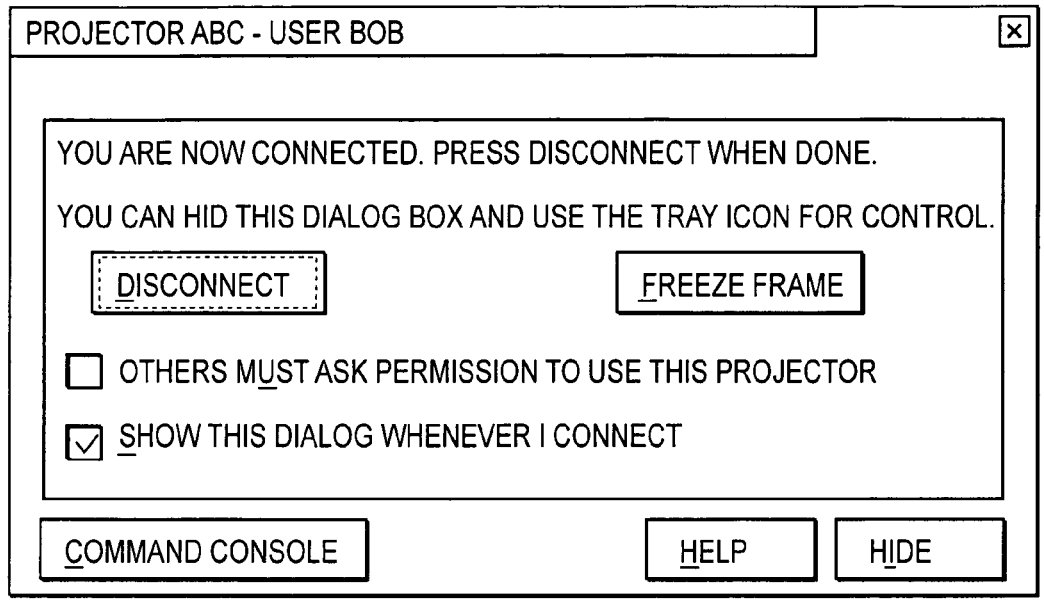
Figure 18:
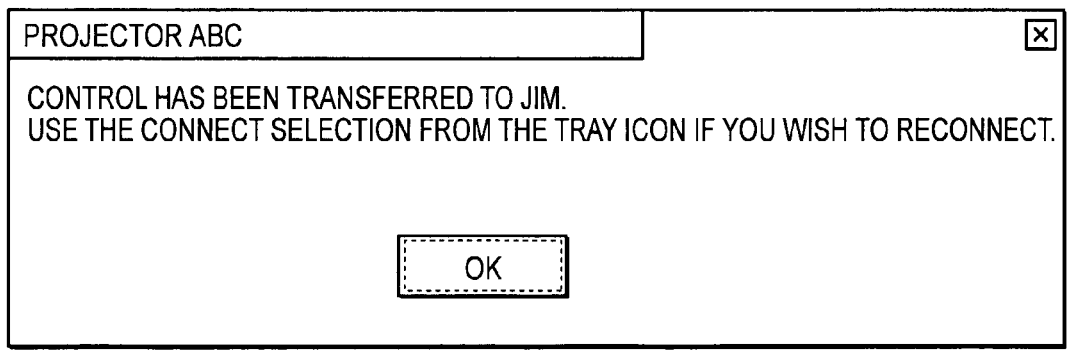

FIG. 15, FIG. 16, FIG. 17, and FIG. 18 illustrate examples of user dialog windows that may be implemented in a self-service multiple-user access mode. In this example, a user Jane initially has control over a display device named Projector ABC. Another user Bob takes control of Projector ABC from Jane. FIG. 15 shows the Sharing Mode section 1320 in FIG. 13, as configured by Jane with radio button 1322 selected, and with the moderator option 1328 not selected. When Bob requests control of the projector, Bob's computing device displays a dialog box 1600 from FIG. 16, informing Bob that "Projector ABC is in Use by Jane," and that Jane will be disconnected if Bob elects to connect nonetheless. If Bob indicates that he wishes to connect nonetheless, his computing device then displays a message such as a dialog box 1700 in FIG. 17, informing him that he now has control over Projector ABC. At the same time, Jane's computing device displays a message such as a dialog box 1800 in FIG. 18, informing her that she has lost control over Projector ABC to Bob.

Figure 19:
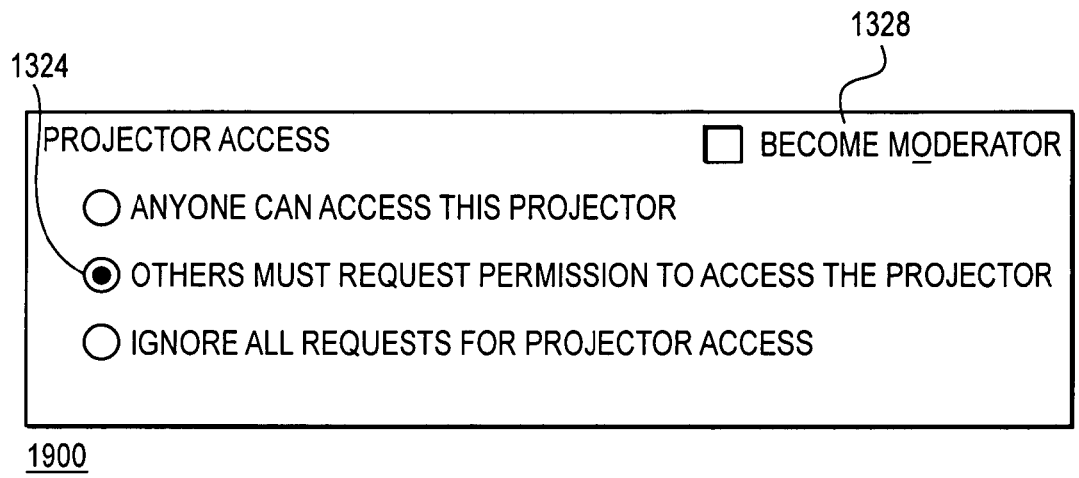
FIG. 19, FIG. 20, FIG. 21, and FIG. 22 illustrate examples of user dialog windows that may be implemented in a roundtable multiple-user access mode.
Figure 20:
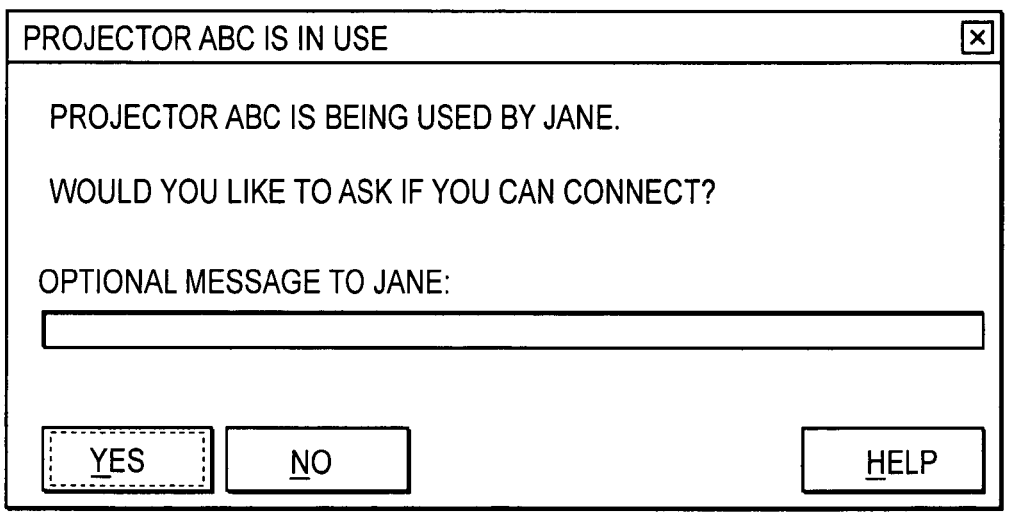
Figure 21:
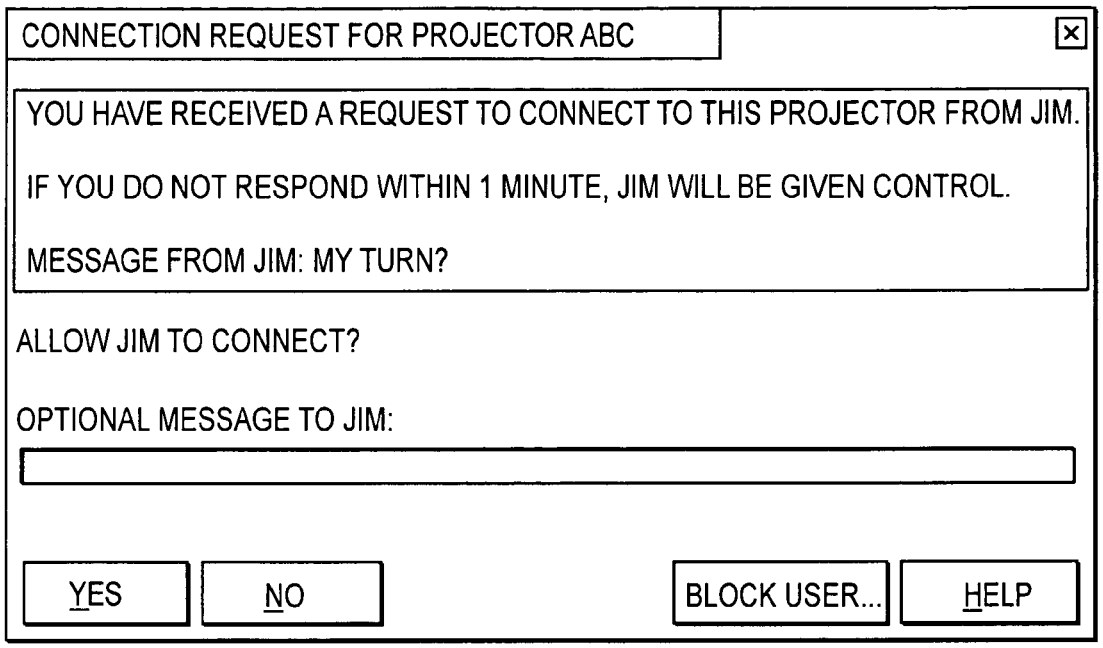
Figure 22:
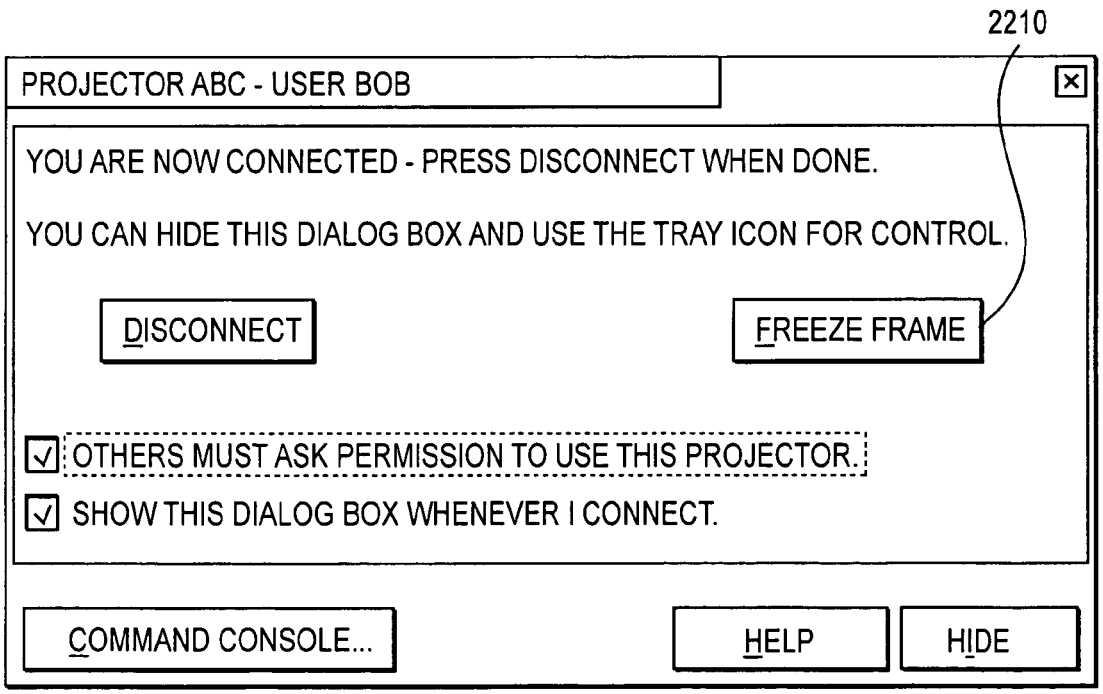

FIG. 19, FIG. 20, FIG. 21, and FIG. 22 illustrate examples of user dialog windows that may be implemented in a round-table multiple-user access mode. In this example, user Jane again initially has control over the display device named Projector ABC. Another user Jim requests and obtains control of Projector ABC from Jane. FIG. 19 shows a Sharing Mode section 1900, as configured by Jane—now with radio button 1324 selected, and with the moderator option 1328 again not selected. When Jim requests control of the projector, Jim's computing device displays a dialog box 2200 in FIG. 20, informing Jim that "Projector ABC is in Use," and offering to request control from the current user Jane. The dialog box 2200 may offer Jim the opportunity to send a customized request message to Jane. If Bob indicates that he wishes to request control, Jane's computing device then displays a message such as a dialog box 2100 in FIG. 21, informing her that Jim wishes to obtain control of Projector ABC. Dialog box 2100 may also relay any custom message from Jim ("My Turn?"). If Jane refuses the request, an appropriate notice is sent to Jim. If Jane approves the request, a notice such as dialog box 2200 in FIG. 22 is sent to Jim, informing Jim that he now has control over Projector ABC.

Dialog box 2200 also illustrates another control tool that may be offered in various implementations of software for sharing display devices. A Freeze Frame button 2210 may be provided, enabling users to stop any motion in an ongoing video or other presentation. The Freeze Frame button may be provided instead of, or as a complement to, the Hide Screen button 1330 discussed above with respect to FIG. 13.

Figure 23:
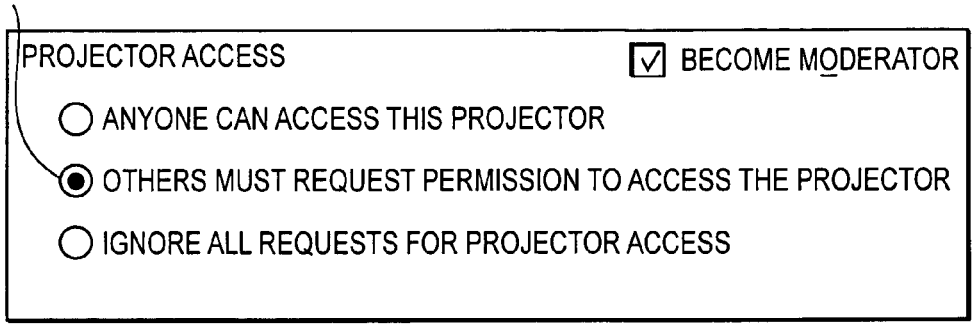
FIG. 23, FIG. 24, and FIG. 25 illustrate examples of user dialog windows that may be implemented in a moderated multiple-user access mode.
Figure 24:
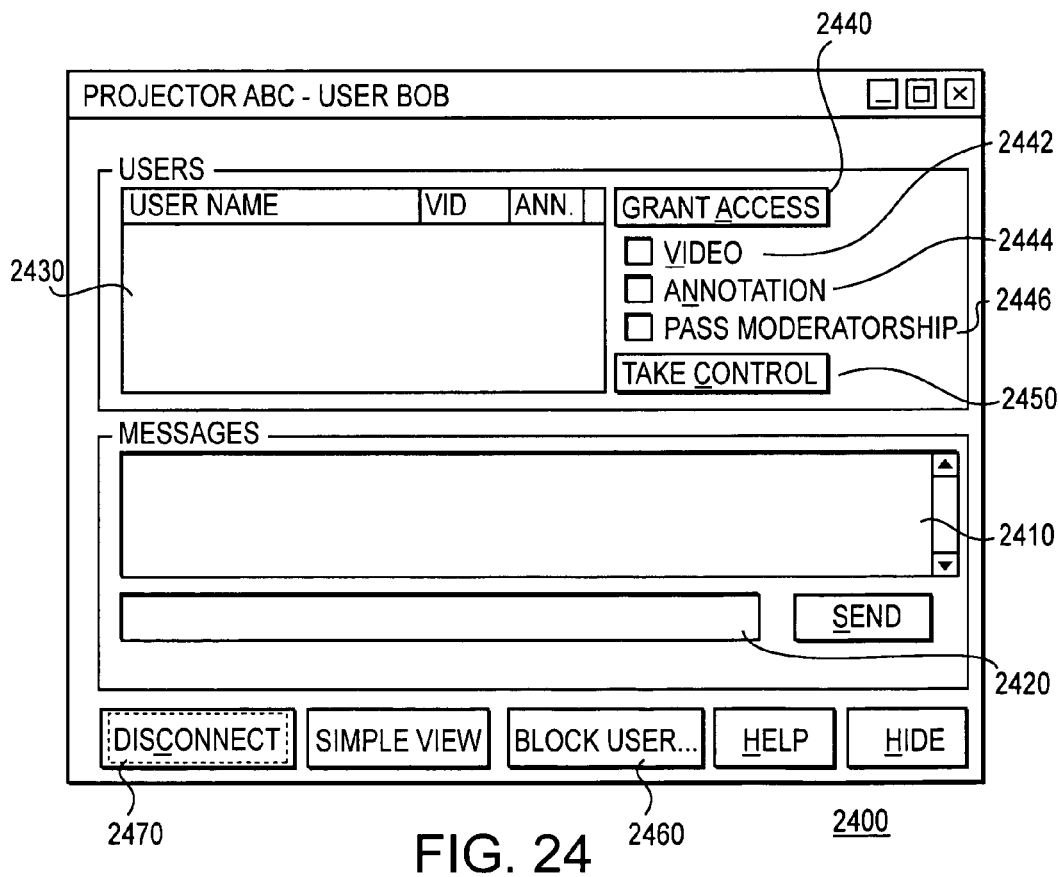
Figure 25:
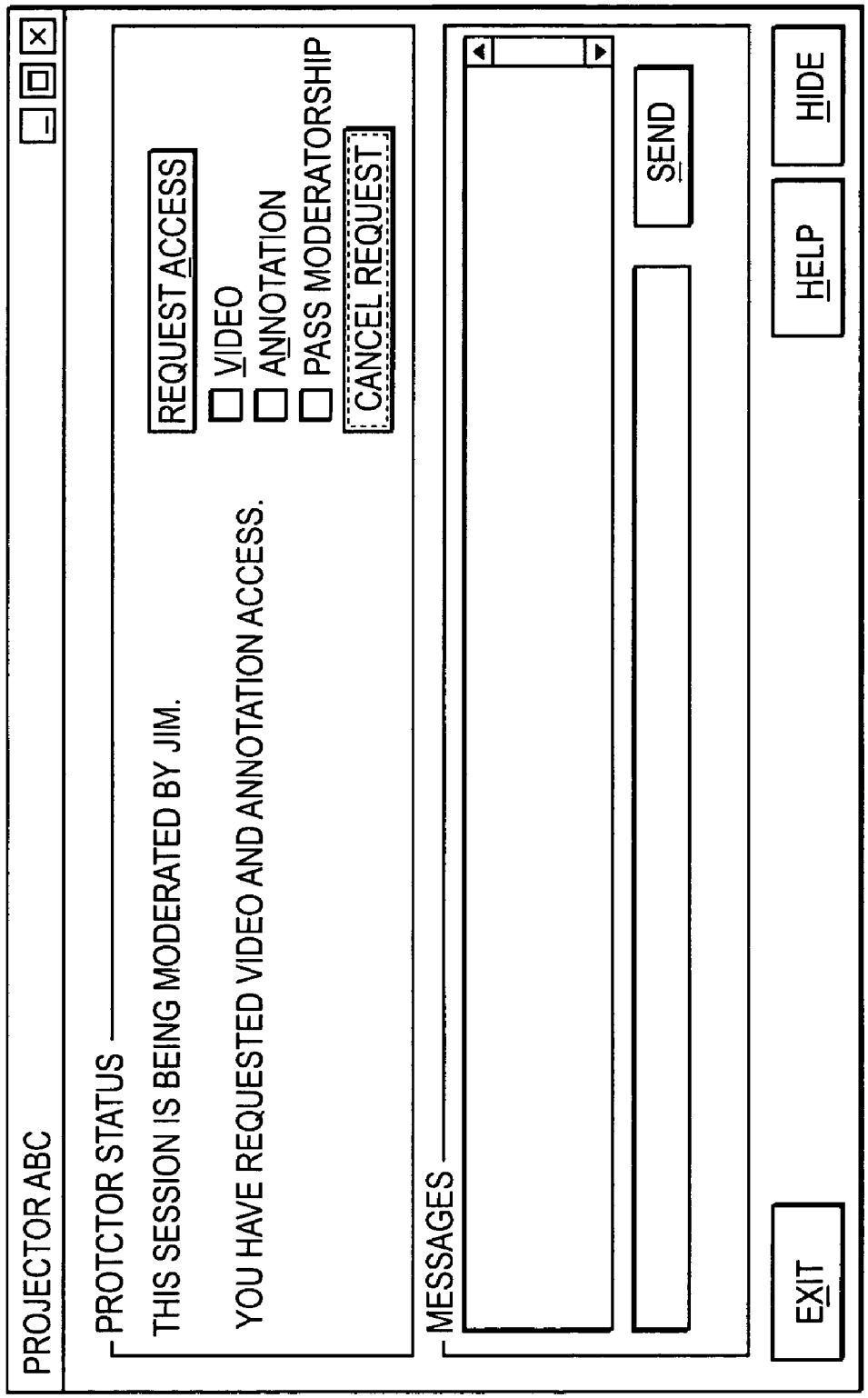

FIG. 23, FIG. 24, and FIG. 25 illustrate examples of user dialog windows that may be implemented in a moderated multiple-user access mode. FIG. 23 shows a Sharing Mode section 1320, with radio button 1324 selected, and also with the moderator option 1328 selected. This selection allows the controlling user to have moderator status regarding interactions with the display device.

A variety of implementations are contemplated for moderated multiple-user access mode. For example, FIG. 24 shows a dialog box 2400 that may be displayed to a user having moderator control over a display device. The dialog box 2400 may include a listing 2430 of other users in communication with the display device, a text screen 2410 that may display text messages received from the other users, an input line 2420 allowing the moderator-user to send messages to the other users, a button 2460 for blocking communications from a specific user, a button 2440 for granting control of the display device to a selected user, a button 2450 for the moderator to himself or herself take control of the display device, a checkbox 2442 to indicate that the type of control being transferred includes privileges for presenting video on the display device (an example of partial control of the display device), a checkbox 2444 to indicate that the type of control being transferred includes privileges for making annotations on another user's presentation (another example of partial control of the display device), a checkbox 2446 to indicate that the type of control being transferred is the moderator status, and a button 2470 for the moderator to disconnect from the display device. Other features may also be included, such as an option to broadcast a message simultaneously to all users in the user listing 2430, or an option to grant temporary control of the display device, among others.

Various types of annotation tools may be included in the interface for a multi-user display system. Annotations may be an option, such as check box 2444, available in a moderated multiple-user access mode, or in a roundtable multiple-user access mode, or in other access modes. An interface may offer one or more annotating users the ability to partly modify a presentation being controlled by another user. One or more levels of annotation control may be provided. For example, annotation access may include only an ability to control a mouse-type pointer on a shared display screen. Alternatively, or in addition, annotation access may offer an annotating user the ability to edit a displayed item, highlight displayed text, add notes in a separate font color, circle portions of a displayed graphic, or combinations of these tools, among others.

When a user requests a connection to a display device that already has a moderator, a dialog box 2500 in FIG. 25 is displayed on that user's computing device. It allows the user to request full or partial access to the display device and to send messages to the current moderator.

A variety of approaches may be used to enable laptop computers, PDAs, and other computing devices to display video on a display device. Depending on implementation, PDAs may generally have slower operating microprocessors than laptop computers. In some situations, compression and storage techniques may be used to compensate for any lower processing speeds in a handheld computing device used in shared-display situations. For example, compressed high resolution data may be initially created on a laptop or desktop computer and downloaded onto a PDA. This compressed data may subsequently be sent to the display device using a wireless protocol. Examples of data coding and compression techniques are disclosed in commonly owned U.S. patent applications Ser. Nos. 09/746,841 and 10/066,402, referenced and incorporated above. The microprocessor in the display device then de-compresses the image before it is presented to the graphics engine. The relevant firmware (or software) may reside in the display device and may run on the display device's microprocessor.

This firmware in the display device may be configured to recognize two PDA data formats. One format may be used for reading and decompressing compressed presentations as described above. Another format may bring in a real-time un-compressed and scaled version of the graphics image being displayed on the PDA screen, regardless of the application running, thereby mirroring the PDA's local display.

In cases where laptop computers and other computing devices with substantially faster processing capabilities are used for sending video to a display device, different compression techniques may be used to compress the graphics on the laptop computer prior to transmitting the graphics. At the display device side, the firmware may determine from the data type which data compression type in the laptop computer is being used. The firmware may support a variety of different compression schemes, and may be able to provide high-resolution video, such as 1024×768 pixels×32 bits of color depth.

A collection of interoperative software and firmware in a shared display system may have several components, such as: an embedded projector program that runs on a wireless module embedded in or connected to a display device (see FIG. 2); a high-speed mirroring program that runs on a client laptop or desktop computer; a low-speed mirroring program that runs on a PDA; PDA Slide Presentation software which runs on the PDA; and a graphics creation program that runs on a laptop or desktop computer to create a presentation for display.

Figure 26:
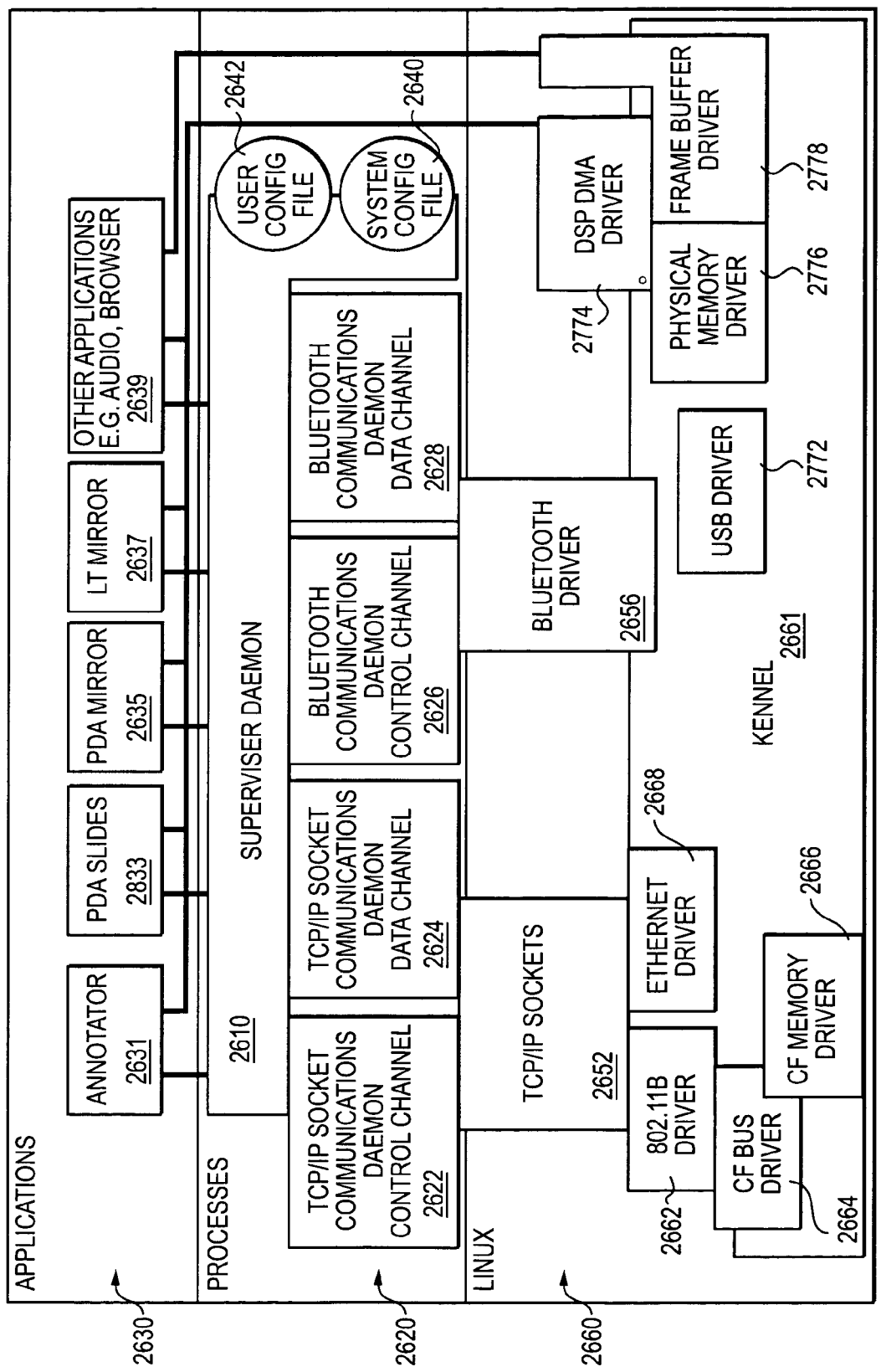
FIG. 26 is a block diagram of one implementation of an architecture for embedded software for a display system.

FIG. 26 is a block diagram of one implementation of an architecture 2600 for embedded software for a shared display system (such as the projector 110). Various portions of the software may be stored in a memory of the shared display system, such as memory in the CPU and memory block 218 shown in FIG. 2, for example. The memory may be a non-volatile memory, such as a flash memory, or a hard disk drive, among others. Some or all of the software may be firmware, permanently installed on the display system. The software may be coded to run on an operating system 2660 such as a Linux operating system, for example.

In the depicted implementation, the first process to start after the operating system has booted is a supervisor daemon 2610. The supervisor daemon 2610 may perform a variety of tasks, including: (1) determining a communications configuration of the system using a system configuration file 2640 to determine which communication daemons are available and should be started; (2) providing a conventional operating system daemon (such as a Linux operating system daemon, not shown) for network configuration; (3) maintaining client connections and a user configuration file 2642 with user credential requirements, so that all client requests may be handled through the supervisor daemon; (4) maintaining a list of logged-in users, keeping track of a user's Controller or Attendee status, keeping track of user permissions (e.g., presenter, annotator, pointer); (5) blocking access to particular applications when user permission has not been not granted (blocking may also be enforced in client software on a user's computing device and may be re-enforced in the shared display system); (6) launching and controlling applications based on requests from users' computing devices; (7) managing data stream FIFO's, providing connections between various communication daemons and user applications, and transferring data; and (8) performing a "healthy check" to test the status of communications connections among devices connected by a wireless network to report on and maintain the network's operating state.

The supervisor daemon 2610 may be configured to supports human language localization. Language localization may be used to allow interface messages in a variety of user-selectable languages, such as English, French, Spanish, or Chinese, for example. In addition to language localization implemented by the supervisor daemon 2610 on a shared display device, additional language selection may be available to individual users for their respective computing devices.

Data may be transferred using a transfer protocol such as NetDisp to route data to appropriate applications running on the shared display system. Various transfer protocols may be implemented to provide a simple, low overhead protocol for transferring control and graphics data. In one example, a transfer protocol includes a header that identifies packet length, data type and user so the supervisor daemon 2610 can route the packets as required. This header may be passed to the corresponding application so the application may verify data type and sort according to the originating user. The front of the header may have a guaranteed fixed format, including, for example, a header length field so the header may be extended as required by the supervisor daemon 2610.

One or more communication daemons 2620 may be started by the supervisor daemon 2610 to provide common connection interfaces for applications, with the connection interfaces independent of underlying network services. The example in FIG. 26 depicts four communications daemons: a TCP/IP socket communications daemon for a control channel 2622, a TCP/IP socket communications daemon for a data channel 2624, a Bluetooth® communications daemon for a control channel 2626, and a Bluetooth® communications daemon for a data channel 2628. These communications daemons may interface with corresponding support software in the operating system 2660, such as TCP/IP sockets 2652 and a Bluetooth driver 2656, for example. A kernel 2661 may support the sockets and drivers 2652 and 2656, as well as other interfaces such as an IEEE 802.11b driver 2662, a CompactFlash® bus driver 2664, a CompactFlash® memory driver 2666, an Ethernet driver 2668, a USB driver 2772, a DSP DMA driver 2774, a RAM driver 2776, and a frame buffer driver 2778.

The communications daemons 2620 may perform a variety of tasks, including: (1) communicating to client devices with a specific protocol (control or data); (2) supporting multiple clients with a single port, for example, by routing data from each user's computer to a corresponding target application through a host processor FIFO; and (3) performing communication "health" checks, for example by checking the status of wireless connections to various wireless devices and display devices connected to the shared display device.

Various applications 2630 may be started by the supervisor daemon 2610 and may each handle multiple users in a single instance. Examples of applications include an annotator 2631, a PDA slide presentation application 2633, a PDA mirror application 2635, a laptop mirror application 2637, and others, such as an audio browser 2639. Control and data may be received via a pipe configured by the supervisor daemon 2610. The supervisor daemon 2610 may launch each application when a user first requests the application. The supervisor daemon 2610 may close an application when the last user releases it. The supervisor daemon 2610 may be used to arbitrate access to a graphics engine or a display engine or other components that process images for display on a shared display device. Such arbitration may be unnecessary for applications that do not share access with other applications. Arbitration may be necessary for some applications, such as the annotator application 2631, which may require simultaneous control over the display in conjunction with other applications.

The annotator application 2631 may be configured to display a mouse cursor or other annotation overlaid on a display of the shared display device. The annotator application 2631 may share the display with one of the other applications. Thus, when one user moves a cursor on the display of the user's wirelessly connected computing system, the annotator may in response cause a cursor may to be moved on the shared display.

The PDA slide presentation application 2633 may be configured to interact with client software installed on a user's PDA (such as PDA 121 from FIG. 1, for example) that is wirelessly connected to the shared display system. The PDA slide presentation application 2633 may be configured to receive PDA slide data and transfer the slide data to the display processing portions of a wireless module (such as wireless module 216 shown in FIG. 2, for example). The PDA slide presentation application 2633 may be configured to manage a cache of received slides. The client software may pre-send slides to reduce any latency due to transmission time. The PDA slide presentation application 2633 may be configured to manage decoded slides in the display processing portions of the wireless module. The wireless module may store one slide being viewed and buffer one slide (the predicted next slide) or more that are ready to be viewed. The PDA slide presentation application 2633 may work with a single user at a time. If the user changes, then any previous cached data may be flushed. Variations may be implemented to manage multiple slide caches or to allow multiple users in a single cache.

The PDA mirror software 2635 may also be configured to interact with client software installed on a user's PDA that is wirelessly connected to the shared display system. The PDA mirror software 2635 may be configured to receive PDA mirror data and transfer the mirror data to DSP display processing portions of the wireless module for decoding and display.

The laptop mirror software 2637 may be configured to interact with client software installed on a user's laptop computer that is wirelessly connected to the shared display system (such as laptop computer 125 from FIG. 1, for example). The laptop mirror software 2637 may be configured to receive laptop mirror data and transfer the mirror data to DSP display processing portions of the wireless module for display. The laptop mirror data may be transmitted without compression. In various implementations, however, the laptop mirror data may be compressed prior to transmission.

Figure 27:
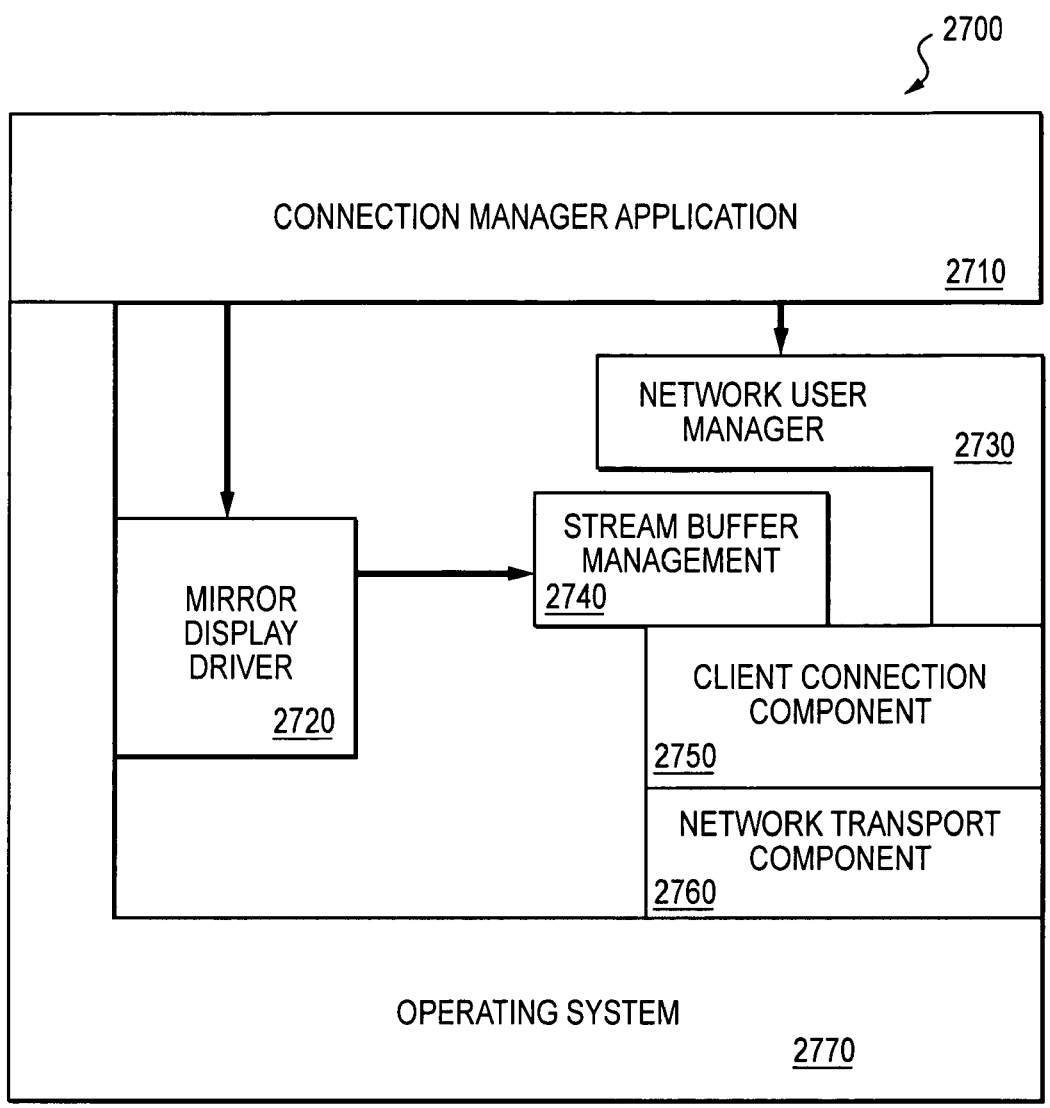
FIG. 27 is a block diagram of one implementation of mirroring software that may be used in a laptop computer.

FIG. 27 is a block diagram of one implementation of mirroring software that may be used in a laptop computer (such as laptop computer 125 from FIG. 1, for example) connected to a shared display system (such as the projector 110, for example). A laptop mirror software 2700 may be configured to run on a user's laptop computer as a client software that works in cooperation with the laptop mirror software 2637 from FIG. 26. The laptop mirror software 2700 may receive laptop mirror (image) data and transfers the image data to display processing portions of a wireless module of a shared display device for decoding and display. Additional features may be added such as browser, audio, video or other functions.

The laptop mirror software 2700 may include several components, such as a connection manager application 2710, a mirror display driver 2720, a network user manager 2730, a stream buffer manager 2740, a client connection component 2750, and a network transport component 2760. The laptop mirror software 2700 may be adapted to run on an operating system 2770 such as, for example, the Windows 2000® or Windows XP® operating systems, among others.

The connection manager application 2710 may be configured to interface with driver components to provide a user with control over a connection to the shared display system. The mirror display driver 2720 may be configured to receive or intercept display driver commands and code the commands into GDCP (Graphics Data-gram Communications Protocol) instructions under control from the connection manager application 2710. Also under control from the connection manager application 2710, the network user manager 2730 may provide platform independent support for user control. The client connection component 2750 may be configured as a platform-independent module that communicates with the network user manager 2730 and the mirror display driver 2720. The client connection component 2750 may be configured to provide a client connection to the shared display device, and may accept GDCP data and wrap the GDCP data in NetDisp protocol for transmission. The network transport component 2760 may be a platform-independent module providing an abstraction of a lower level network interface for the client connection component 2750. In one implementation, the network transport component 2760 uses a TCP/IP socket interface. Other implementations may also be used, such as interfaces that support Bluetooth® or RS-232. The laptop mirror software 2700 may also provide language localization, for example in the connection manager application 2710.

Figure 28:
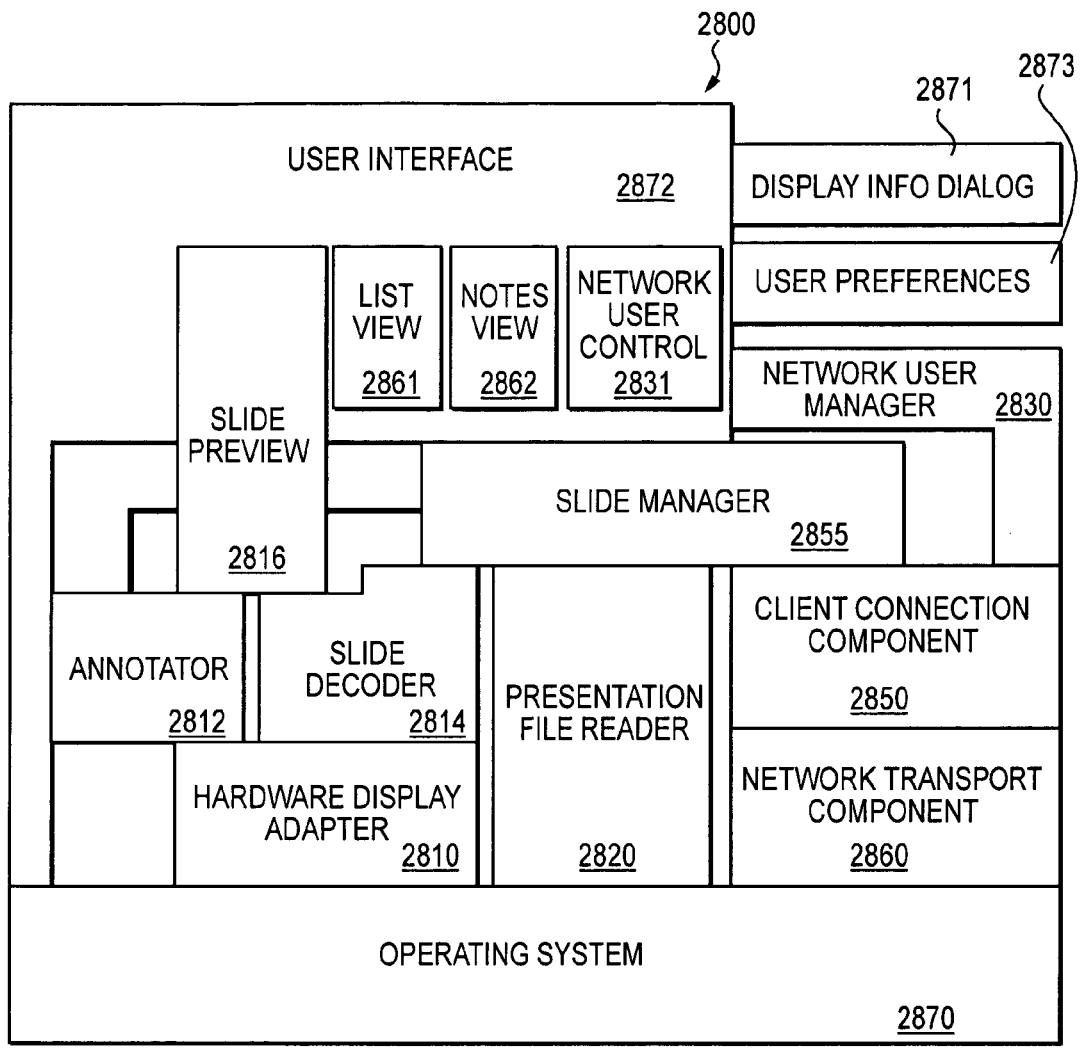
FIG. 28 is a block diagram of one implementation of PDA slide presentation software.

FIG. 28 is a block diagram of one implementation of PDA slide presentation software 2800 useable on a PDA (such as PDA 121 from FIG. 1, for example) for interfacing with a shared display device (such as the projector 110 shown in FIG. 1, for example). The software 2800 may also be used on other handheld devices, such as a cell phone. The software 2800 may be configured to seamlessly interface with an operating system 2870 for a handheld device. Examples of operating systems 2870 include Palm OS®, Windows CE®, Linux, and Embedded Linux. The software 2800 may be used with PDAs connected wirelessly or through wired connections to shared display systems, and may optionally be configured to interface with a hardware display adapter 2810 connected to the PDA. An example of a hardware display adapter is the Presenter-to-Go® from Margi Systems.

The hardware display adapter 2810 may interface with the operating system 2870. The software 2800 may also include other components that interface with the operating system 2870, such as a file reader 2820 for reading presentation files, a network transport component 2860 that uses a TCP/IP socket interface or other drivers (such as Bluetooth® or RS-232) to provide a wireless or wired connection to the network, and a client connection component 2850 that may receive presentation data and wrap the data in a transfer protocol for transmission, among others.

Components that may be associated with the hardware display adaptor 2810 include an annotator 2812 for slides that are shown through the adapter, and a slide decoder 2814 that may be used to decode presentation files. The slide decoder 2814 may be configured to parse standard-formatted presentation files, such as GIF, JPEG, text, or Microsoft PowerPoint® files, for example. Alternatively, or in addition, the file reader 2820 may be configured to decode encoded presentation files, such as files that may be stored in a compacted, compressed, or encrypted format customized for the software 2800. The annotator 2812 may also used in conjunction with a slide preview applet 2816 on the PDA screen. A user interface 2872 may convey user instructions and information between PDA I/O interfaces and various software components, such as the operating system 2870, the annotator 2812, and the slide preview applet 2816. The user interface 2872 may offer tools such as a list view 2861 (to list all slide headers for the user), a notes view 2862 (to display notes associated with each slide), and a network user control 2831 (to provide for a user's selection of security options, connection options, and other user options).

A slide manager 2855 may be included in the software 2800. The slide manager 2855 may communicate with the file reader 2820 and the slide decoder 2814 to organize various presentations from which a user may choose to present to an audience through a shared display system. A network user manager 2830 may be included to implement a meeting management protocol using communication with user interface 2872. A user preferences block 2873 and a display info block 2871 may also communicate with the user interface 2872.

Figure 29:
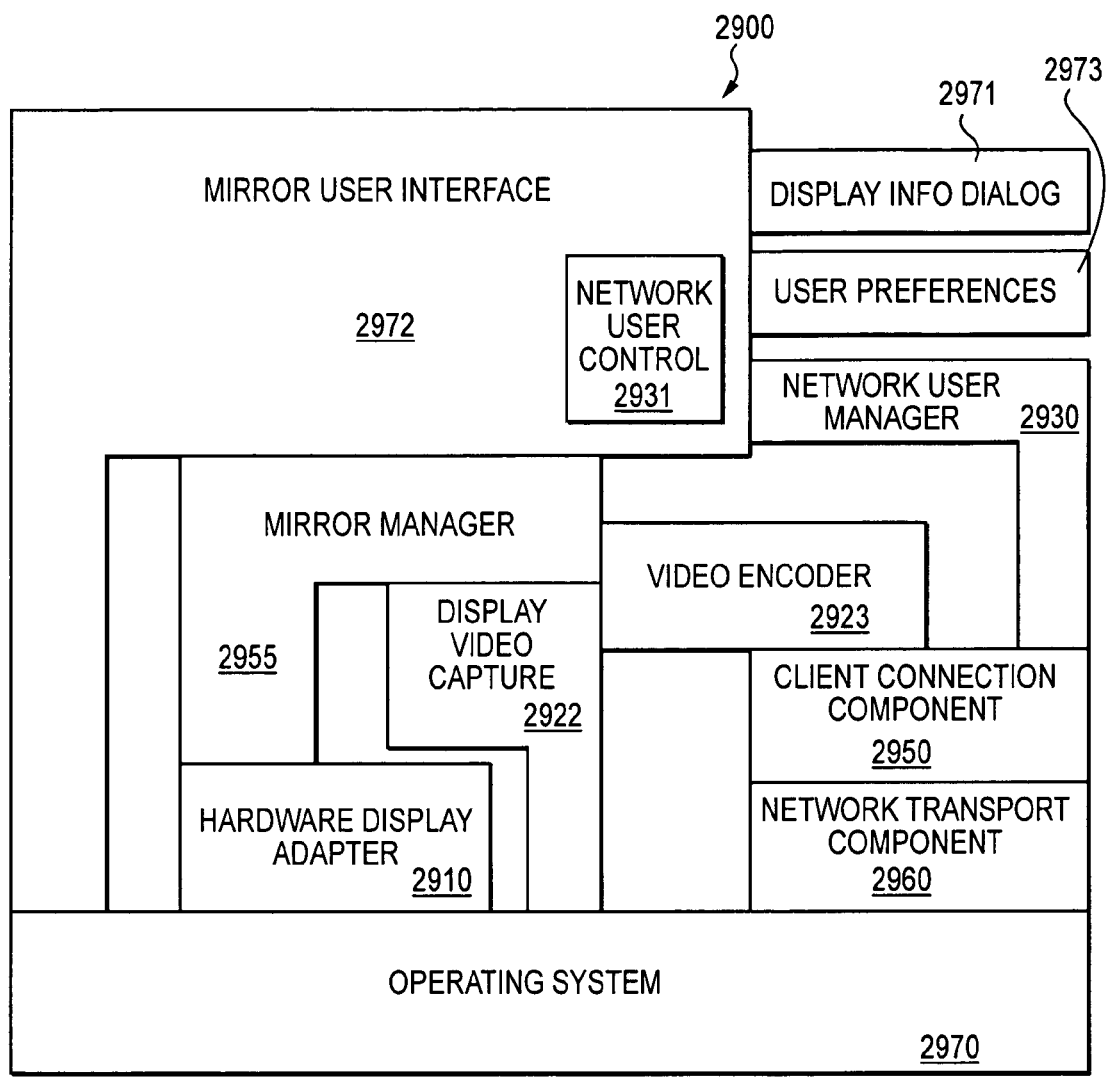
FIG. 29 is a block diagram of one implementation of mirroring software that may be used in a PDA.

FIG. 29 is a block diagram of one implementation of mirroring software 2900 that may be used on a PDA (such as PDA 121 from FIG. 1, for example) or other hand held computing device for interfacing with a shared display device (such as the projector 110 shown in FIG. 1, for example). The PDA mirroring software 2900 may be configured to run on a user's handheld computing device as a client software that works in cooperation with the PDA mirror software 2635 from FIG. 26. The mirroring software 2900 may be used to reproduce a display screen of the PDA onto the shared display device. The software 2900 may be used with PDAs connected wirelessly or through wired connections to shared display systems, and may optionally be configured to interface with a hardware display adapter 2910 connected to the PDA. An operating system 2970 on the PDA may interface with the hardware display adapter 2910. The software 2900 may also include other components that interface with the operating system 2970, such as a network transport component 2960 that uses a TCP/IP socket interface or other drivers (such as Bluetooth® or RS-232) to provide a wireless or wired connection to the network, and a client connection component 2950 that may receive presentation data and wrap the data in a transfer protocol for transmission, among others.

A user interface 2972 may convey user instructions and information between PDA I/O interfaces and various software components, such as the operating system 2970 and a mirror manager 2955. The user interface 2972 may offer tools such as a network user control 2931 to provide for a user's selection of security options, connection options, and other user options for making and managing the connection to the shared display device. A network user manager 2930 may be included to implement a meeting management protocol using communication with user interface 2972. A user preferences block 2973 and a display info block 2971 may also communicate with the user interface 2972.

The mirror manager 2955 may communicate with a display video capture block 2922 and a video encoder 2923. The display video capture block 2922 may be configured to perform screen scraping. The scraped data may then be compressed in the video encoder 2923 using standard compression techniques such as JPEG formatting or various other standard compression techniques. Customized techniques adapted for presentation-format video may also be used. The mirror manager 2955 may be configured to receive data from the encoder 2923 and deliver the data to the network transport component 2960. The mirror user interface 2972 may provide a user with options for the size of the screen, orientation, and other parameters to be used in configuring the shared display.

Figure 30:
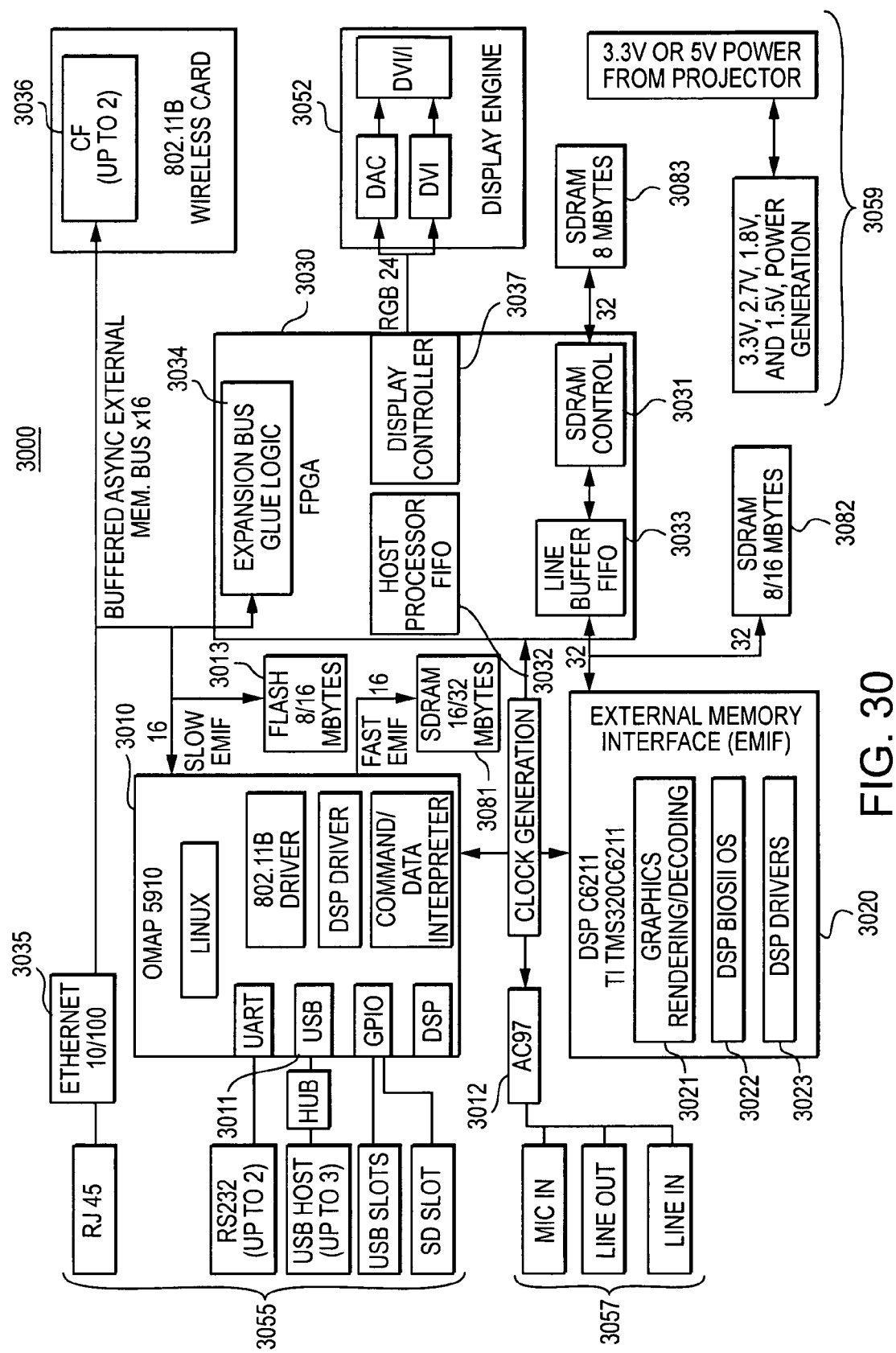
FIG. 30 is a block diagram of one implementation of a wireless module in a display device.

FIG. 30 is a block diagram of a circuit 3000 that may be used in a shared display device, such as the projector 110 shown in FIG. 1, for example. The circuit 3000 may be implemented in a wireless module, such as wireless module 216 shown in FIG. 2, for example. Circuit 3000 includes a processor 3010, a digital signal processor (DSP) 3020, and a frame display manager 3030. The processor 3010 may be an OMAP 5910 controller running Embedded Linux, for example. Various components, such as frame display manager 3030 for example, may be implemented in field programmable gate array (FGPA) circuitry.

The processor 3010 may include a USB host 3011, and may be coupled to an AC97 audio DSP interface 3012, and a flash memory 3013 holding Linux operating system software and programs. The AC97 audio DSP interface 3012 may support a microphone interface and an audio line-out to speakers 3057. Communication interfaces may be provided to the processor 3010 and the frame display manager 3030 through a variety of interfaces 3055, such as RJ45/Ethernet, RS232, USB, USB 2.0, and IEEE 1394, among others.

The DSP 3020 may include a graphics rendering and decoding section 3021, a DSP BIOS 3022, and DSP Drivers 3023. The frame display manager 3030 may include a display controller 3037 that operates with an SDRAM controller 3031, a host FIFO interface 3032, a line buffer FIFO 3033, and an expansion bus logic 3034. The Expansion Bus Logic 3034 may be configured to provide interfaces to an Ethernet controller 3035 and a CompactFlash® (CF) interface 3036. The CF interface 3036 may support two CF slots, one dedicated to wireless CF cards and the other to storage cards.

The Ethernet controller 3035 and the CF interface 3036 may be configured to work with the processor 3010 and the DSP 3020 so that the circuit 3000 includes the ability to receive video data from a CF memory card or from a remote file accessible through an Ethernet connection. For example the circuit 3000 may be adapted to provide a user with the ability to store a presentation on a CF card or on an Internet-accessible file, and to access and present the presentation on a display system. Thus, a user may be able to plug a CF card into a display system and issue a command to the display system to display an audiovisual presentation stored on the CF card. The command may be provided to the display system through buttons or switches on the display system, or through a user interface on a computing device connected to the display system. In addition to CF cards, the use of other memory storage media is also contemplated, such as USB memories (eg. through USB host 3011) and other portable semiconductor memories, CD ROM's and other optical storage, or floppy disks and other magnetic storage, or other memory media. Similarly, a user may be able to issue a command to the display system to display an audiovisual presentation stored in a file or on a server or at a URL accessible through an internet connection or other network connection. The user may be able to instruct the display system to access the remotely stored audiovisual presentation, for example, through a user interface on a PDA wirelessly coupled to the display system.

Video data (which may include graphics, or video, or audio, or combinations thereof) may be received by a CF wireless card in the CF interface 3036 and delivered to the frame display manager 3030, which in turn sends packets of the video data to the processor 3010 for parsing and processing. The processor 3010 parses the data and determines the content. If the content is graphics, the processor 3010 may send the graphics to the DSP 3020 for processing. If the content is encoded, the processor 3010 decodes the data and sends it to the frame display manager 3030 for display though a video interface 3052.

Various memory circuits, such as ROM, RAM, SRAM, DRAM, flash, EEPROM, and the like may be provided, such as memories 3081, 3082, and 3083, connected respectively to processor 3010, DSP 3020, and frame display manager 3030, respectively. Memory circuits may be shared through common busses, such as for example, memory 3082, which is shared with frame display manager 3030. Power may be supplied to various components in circuit 3000 through a power conversion module 3059 that accepts supplied power (at 3.3 VDC or 5 VDC, for example) and provides power at voltage levels appropriate for a particular implementation (for example 3.3 VDC, 2.7 VDC, or 1,8 VDC).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A shareable display system comprising:
at least one multimedia display;
a data port configured to receive first control data through a first data link with a first computing device and configured to receive second control data through a second data link with a second computing device, the first and second control data for controlling information displayed on the multimedia display;
a processor configured to:
receive at least one of the first and second control data, via the first and second data links, from at least one of the first computing device and second computing device;
determine at least one right to control a shareable resource of the multimedia display from the respective device that transmitted the control data;
determine whether the control data received matches the at least one right to control the shareable resource multimedia display;
executing the control data if the control data matches the at least one right,
where at least one of the first and second data links comprise a wireless data link.

2. The shareable display system of claim 1, where the processor is further configured to arbitrate between video data received through the first and second data links in a roundtable mode.

3. The shareable display system of claim 1, where the processor is configured to arbitrate between video data received through the first and second data links in a moderator mode.

4. The shareable display system of claim 1, where the first computing device comprises a portable computer and the first data link receives high-bandwidth data from the portable computer, and
where the second computing device comprises a handheld computing device and the second data link receives low-bandwidth data from the handheld computing device.

5. The shareable display system of claim 4, where the handheld computing device comprises a PDA.

6. The shareable display system of claim 4, where the handheld computing device comprises a cellular telephone.

7. The shareable display system of claim 1, further comprising a memory-card interface, where the data port is further configured to receive data from a memory card removably coupled to the memory-card interface.

8. The shareable display system of claim 1, where the first computing device comprises a PDA unit.

9. The shareable display system of claim 1, where the second computing device comprises a laptop computer.

10. The shareable display system of claim 1, where the shareable display system comprises a video projector.

11. The shareable display system of claim 1, where the shareable display system comprises a wireless audio receiver, and
where the selected video data includes compressed audio data.

12. The shareable display system of claim 1, where the shareable display system is comprised in a module configured to be removably attached to a video projector.

13. The shareable display system of claim 1, where the first data link comprises a wireless Ethernet link from the first computing device.

14. The shareable display system of claim 1, where the first data link comprises a wired Ethernet link from the first computing device.

15. The shareable display system of claim 1, where the first data link comprises a wireless Bluetooth® link from the first computing device.

16. The shareable display system of claim 1, where video data received through the first data link includes compressed image information.

17. The shareable display system of claim 1, where video data received through the first data link includes uncompressed image information.

18. The shareable display system of claim 1, where video data received through the first data link includes compressed video information.

19. The shareable display system of claim 1, where video data received through the first data link includes uncompressed video information.

20. The shareable display system of claim 1, where the data port is configured to interface with the first computing device so that the multimedia display comprises an extended monitor for the first computing device.

21. The shareable display system of claim 1, where the data port is configured to interface with the first computing device so that the multimedia display reproduces an image displayed on a local screen of the first computing device.

22. The shareable display system of claim 1, where the control data comprises a blanking command; and
where the processor is configured to blank the video display in response to the blanking command from the first computing device.

23. The shareable display system of claim 1, where the first and second data links are formed with a network server.

24. The shareable display system of claim 1, where the first and second data links are ad-hoc links.

25. The shareable display system of claim 1, where the processor is configured to display a communications dialog interface on the first computing device.

26. The shareable display system of claim 25, where the communications dialog interface is user-configurable to include text in a native language of a user.

27. The shareable display system of claim 1, further comprising an update module configured to receive update information from a server computer through a network connection,
where the update information is useable in updating the controller.

28. The shareable display system of claim 27, where the controller comprises a processor and a memory holding computer instructions for the processor, and
where the update information comprises updated computer instructions.

29. The shareable display system of claim 1, further comprising an identification module coupled to the data port and configured to identify the first and second computing devices.

30. The shareable display system of claim 1, further comprising an identification module coupled to the data port and configured to identify users of the first and second computing devices.

31. The shareable display system of claim 30, where the identification module includes a memory comprising identifying characteristics of the first and second computing devices.

32. The shareable display system of claim 30, where the identification module includes an interface to a data file accessible through a computer network,
where the data file comprises identifying characteristics of the first and second computing devices.

33. The shareable display system of claim 1, where at least one of the first computing device and second computing device is a moderator device.

34. The shareable display system of claim 33, where the processor determines rights to control the multimedia display based on whether the device that transmitted the control data is the moderator device.

35. The shareable display system of claim 1, where the shareable resource of the multimedia display comprises a mouse cursor; and
where the control data received comprises data indicative of controlling the mouse cursor displayed on the multimedia display.

36. The shareable display system of claim 1, where the shareable resource of the multimedia display comprises editing at least a portion of information displayed on the multimedia display; and
where the control data received comprises data indicative of editing the at least a portion of the information displayed on the multimedia display.

37. The shareable display system of claim 36, where the control data comprises data indicative of highlighting text displayed on the multimedia display.

38. The shareable display system of claim 1, where the shareable resource of the multimedia display comprises displaying text on the multimedia display; and
where the control data received comprises data indicative of the text for display on the multimedia display.

39. The shareable display system of claim 38, where the processor is further configured to determine a color of the text based on whether the first computing device or second computing device sent the control data.

40. The shareable display system of claim 1, where the shareable resource of the multimedia display comprises displaying at least one image on the multimedia display; and
where the control data received comprises data indicative of the at least one image for display on the multimedia display.

41. The shareable display system of claim 40, where the processor is further configured to arbitrate between video data received through the first and second data links in a roundtable mode.

42. The shareable display system of claim 1, where the first computing device comprises a device designated to control the shareable display system; and
further comprising:
receiving data from the second computing device requesting control of the shareable display system; and
determining whether to transfer control to the second computing device for at least a part of the sharable display system.

43. The shareable display system of claim 42, where the first computing device comprises a moderator designated to control the shareable display system; and
where determining whether to transfer control to the second computing device comprises determining whether to designate the second computing device as the moderator designated to control the shareable display system.

\* \* \* \* \*